(12) United States Patent
Nishii

(10) Patent No.: US 11,662,734 B2
(45) Date of Patent: May 30, 2023

(54) TARGET ROUTE GENERATION SYSTEM FOR WORK VEHICLE

(71) Applicant: Yanmar Power Technology Co., Ltd., Osaka (JP)

(72) Inventor: Yasuto Nishii, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 0 days.

(21) Appl. No.: 17/707,894

(22) Filed: Mar. 29, 2022

(65) Prior Publication Data

US 2022/0221874 A1    Jul. 14, 2022

Related U.S. Application Data

(63) Continuation of application No. 16/766,664, filed as application No. PCT/JP2018/038142 on Oct. 12, 2018, now Pat. No. 11,314,261.

(30) Foreign Application Priority Data

Dec. 6, 2017    (JP) .............................. 2017-234512

(51) Int. Cl.
  *G05D 1/02*    (2020.01)
  *A01B 69/04*    (2006.01)
  *G01C 21/20*    (2006.01)

(52) U.S. Cl.
  CPC ......... *G05D 1/0219* (2013.01); *A01B 69/008* (2013.01); *G01C 21/20* (2013.01);
  (Continued)

(58) Field of Classification Search
  CPC ............... G05D 1/0219; G05D 1/0212; G05D 2201/0201; G05D 2201/0208; G01C 21/20
  See application file for complete search history.

(56) References Cited

U.S. PATENT DOCUMENTS 6,128,574 A  * 10/2000  Diekhans ............. G05D 1/0278
                                                   701/410
6,907,336 B2 *  6/2005  Gray ..................... A01B 69/008
                                                   701/25
(Continued)

FOREIGN PATENT DOCUMENTS

JP    2006-267079     * 10/2006
JP    2010-231698     * 10/2010
(Continued)

OTHER PUBLICATIONS

2630 GreenStar Display (Operator's Manual); Deer & Co.; Moline, IL; (c) 2011 (Year: 2011).*

*Primary Examiner* — Michael J Zanelli
(74) *Attorney, Agent, or Firm* — Chris Mizumoto

(57) ABSTRACT

An objective of the present invention is to make it possible to obtain, with a simple operation, a target route for autonomous travel suited to, for example, a user's sense of values. A target route generation system for a work vehicle includes a storage part 30A that stores basic data necessary for generating a target route P for autonomous travel, a priority item selection part 34 that prompts selection of a priority item with regard to generation of the target route P, and a target route generation part 30D that generates the target route P based on the basic data and the selected priority item.

3 Claims, 12 Drawing Sheets

(52) U.S. Cl.
CPC .............. *G05D 2201/0201* (2013.01); *G05D 2201/0208* (2013.01)

(56) References Cited

U.S. PATENT DOCUMENTS

| | | | | |
|---|---|---|---|---|
| 11,320,279 | B2 * | 5/2022 | Tomita | A01B 69/008 |
| 2005/0197175 | A1 * | 9/2005 | Anderson | A01G 23/00 460/1 |
| 2015/0319913 | A1 * | 11/2015 | Foster | G05D 1/0217 701/26 |
| 2017/0192431 | A1 * | 7/2017 | Foster | G05D 1/0217 |
| 2017/0300064 | A1 * | 10/2017 | Wolters | G05D 1/0219 |

FOREIGN PATENT DOCUMENTS

| | | | | |
|---|---|---|---|---|
| JP | 2016-093125 | * | 5/2016 | |
| JP | 2017-127290 | * | 7/2017 | |
| JP | 2017-174229 | * | 9/2017 | |
| WO | WO-2018047500 A1 | * | 3/2018 | ............. A01B 69/00 |

\* cited by examiner

TARGET ROUTE GENERATION SYSTEM FOR WORK VEHICLE

CROSS-REFERENCE

This application is a continuation of U.S. application Ser. No. 16/766,664, filed on May 22, 2020, which is a national phase of an international application, PCT/JP2018/038142 filed on Oct. 12, 2018, which claims the benefit of Japanese Application No. 2017-234512 filed on Dec. 6, 2017.

TECHNICAL FIELD

The present invention relates to a target route generation system for a work vehicle that generates a target route for the autonomous travel of a passenger work vehicle such as a tractor, a passenger rice planter, a combine, a passenger mower, a wheel loader, or a snowplow, and an unmanned work vehicle such as an unmanned mower.

BACKGROUND ART

As the above-described target route generation system for a work vehicle, for example, there is a route generation apparatus that is configured to generate a target route for the autonomous travel in accordance with the user's sense of value based on input arbitrary setting data after the user manually inputs, as the arbitrary setting data for the target route generation, a plurality of work area determination points such as the corner positions or the inflection points of a field (work area), the work start position, the work start direction, the work end position, etc. in accordance with the user's sense of value based on the work field data such as the size or the shape of the field that is acquired after a tractor (work vehicle) travels along the outer periphery of the field (see for example Patent Literature 1).

CITATION LIST

Patent Literature

Patent Literature 1: Japanese Laid-open Patent Publication No. 2017-173986

DISCLOSURE OF INVENTION

Problems to be Solved by the Invention

In the target route generation system for a work vehicle disclosed in Patent Literature 1, the user inputs all the arbitrary setting data necessary for generating a target route. This allows the user who is used to inputting the arbitrary setting data to input the arbitrary setting data in accordance with the user's sense of value, and the like, whereby it is possible to generate a target route in accordance with the user's sense of value, etc. with the target route generation system.

However, for the user who is not skillful at the operation for inputting arbitrary setting data, inputting the arbitrary setting data is often time-consuming, and therefore there is demand for simplification of the input. Furthermore, when the arbitrary setting data based on the user's sense of value, etc. is not appropriately input, accordingly, there is a possibility of an inappropriately generated target route that does not match the user's sense of value and that causes disadvantages during the work using the autonomous travel, for example, a narrow working size obtained from the target route generated by the target route generation system or the long non-working travel distance in the target route generated by the target route generation system.

In view of the above situation, the principal object of the present invention is to generate a target route for the autonomous travel suitable for the user's sense of value, or the like, without forcing the user to input arbitrary setting data so as to achieve a beneficial work using the autonomous travel.

Means for Solving the Problems

A first characteristic configuration of the present invention is that a target route generation system for a work vehicle includes a storage part that stores basic data necessary for generating a target route for autonomous travel, a priority item selection part that prompts selection of a priority item with regard to generation of the target route, and a target route generation part that generates the target route based on the basic data and a selected priority item.

With this configuration, when the user performs the operation to select the priority item corresponding to his/her sense of value, or the like, with the priority item selection part, the target route generation part generates a target route suitable for the user's sense of value, or the like, based on the basic data stored in the storage part and the priority item selected by the user.

Thus, the user simply performs the operation to select a priority item corresponding to his/her sense of value, or the like, without inputting arbitrary setting data necessary for generating a target route, such as a plurality of work area determination points, a work start position, a work start direction, or a work end position, so as to obtain a target route suitable for his/her sense of value, etc.

That is, it is possible to generate a target route for the autonomous travel suitable for the user's sense of value, or the like, without forcing the user to input arbitrary setting data, and it is possible to achieve a beneficial work using the autonomous travel.

The second characteristic configuration of the present invention is to include a route selection part that, when the target route generation part generates the plurality of target routes, prompts selection of either one of the plurality of target routes.

With this configuration, for example, in a case where the target route generation part generates a plurality of target routes, the user may select the target route for the autonomous travel that is more suitable for his/her sense of value, or the like, from the plurality of target routes, and it is possible to achieve a beneficial work using the autonomous travel more effectively.

The third characteristic configuration of the present invention is that the target route generation part generates the plurality of target routes for the single priority item.

With this configuration, for example, even when the user selects a single priority item corresponding to his/her sense of value, or the like, with the priority item selection part, the target route generation part generates a plurality of target routes corresponding to the priority item, whereby the user may select the target route for the autonomous travel that is more suitable for his/her sense of value, or the like, from the plurality of target routes corresponding to the single selected priority item, and it is possible to achieve a beneficial work using the autonomous travel more effectively.

The fourth characteristic configuration of the present invention is to include an arbitrary data input part to which arbitrary setting data for target route generation is input, wherein the target route generation part generates the plurality of target routes including a first target route based on the basic data and the priority item and a second target route based on the basic data and the arbitrary setting data.

With this configuration, when a target route for the autonomous travel is generated, the user may select the simple operation for only selecting a priority item with the priority item selection part and the normal operation for arbitrarily inputting all the arbitrary setting data necessary for generating the target route with the arbitrary data input part.

Thus, if the user is not skillful at inputting arbitrary setting data, the user may perform the simple operation so as to easily obtain a first target route suitable for his/her sense of value, etc. Alternatively, if the user is used to inputting arbitrary setting data, the user may perform the normal operation so as to obtain a second target route based on his/her own sense of value, etc.

As a result, for users who are not skillful at inputting arbitrary setting data, it is possible to achieve a beneficial work using the autonomous travel due to a simple selection operation. Furthermore, for users who are used to inputting arbitrary setting data, it is possible to achieve a beneficial work using the autonomous travel more effectively due to the appropriate input of the arbitrary setting data.

The fifth characteristic configuration of the present invention is to include a display part that displays the target route, wherein when the target route generation part generates the plurality of target routes, the display part displays a difference between the plurality of target routes together with the plurality of target routes.

With this configuration, when the target route generation part generates a plurality of target routes, the user may visually recognize a difference between them in an easy way, and thus the target route more suitable for the user's sense of value, or the like, may be easily selected.

The sixth characteristic configuration of the present invention is to include an arbitrary data input part to which at least part of arbitrary setting data for target route generation is input, wherein the target route generation part corrects the first target route based on the arbitrary setting data.

With this configuration, when the user feels dissatisfied with the target route generated by the target route generation part based on the priority item selected by the user, the user inputs the arbitrary setting data suitable for eliminating the dissatisfaction with the arbitrary data input part. Then, the target route generation part corrects the target route corresponding to the priority item based on the arbitrary setting data that is input by the user. Thus, the user may obtain the target route in which the dissatisfaction is eliminated.

Specifically, if the user feels dissatisfied with the autonomous travel start point and the autonomous travel end point of the target route, because it is far from the entrance and the exit of the work area for a work vehicle, the user inputs the autonomous travel start point and the autonomous travel end point suitable for eliminating the dissatisfaction with the arbitrary data input part so that the target route generation part corrects the target route corresponding to the priority item based on the autonomous travel start point and the autonomous travel end point input by the user, thus, the user may obtain the target route where the autonomous travel start point and the autonomous travel end point are set at the positions close to the entrance and the exit of the work area for a work vehicle.

As a result, the user may perform a relatively simple operation to obtain a target route that is more suitable for his/her sense of value, etc., and it is possible to achieve a beneficial work using the autonomous travel more effectively.

The seventh characteristic configuration of the present invention is that the priority item includes at least one of maximization of a working size, minimization of a non-working travel distance, optimization of a circling travel route area along an outer periphery of the work area, and avoidance of generation of an overlapped route area.

With this configuration, for example, when the priority item is the maximization of a working size, the target route generation part generates the target route based on the priority item so as to maximize the working size that may be conducted during the autonomous travel of a work vehicle.

For example, when the priority item is the minimization of a non-working travel distance, the target route generation part generates a target route based on the priority item so as to reduce the fuel consumption required for the non-working travel, reduce the working time, or the like, during the autonomous travel of the work vehicle.

For example, when the priority item is the optimization of the circling travel route area, the target route generation part generates a target route based on the priority item such that the width of the circling travel route area, which is an unworked area after the work vehicle travels on the center side of the work area during the autonomous travel of the work vehicle, is the same or substantially the same as the integral multiple of the working width of the work vehicle regardless of the shape of the work area. This makes it easy to perform a circling work travel during the autonomous travel or the manual drive of the work vehicle. This target route is advantageous in the autonomous travel for a tilling work using a tractor designed for tilling or a planting work using a passenger rice planter as examples of the work vehicle.

For example, when the priority item is the avoidance of generation of an overlapped route area, the target route generation part generates a target route based on the priority item so as to eliminate an overlapped route area. Thus, it is possible to prevent the occurrence of the problem in that it is difficult to do a work as the route area is beaten due to the overlapped travel that is the travel multiple times on the same overlapped route area in the target route of the work vehicle during the autonomous travel of the work vehicle. This target route is advantageous in the autonomous travel for a tilling work using a tractor designed for tilling or a planting work using a passenger rice planter as examples of the work vehicle.

That is, it is possible to generate a target route corresponding to each priority item, and thus it is easy to achieve a beneficial work using the autonomous travel suitable for a different sense of value depending on the user.

DESCRIPTION OF EMBODIMENTS

An embodiment in which a target route generation system for a work vehicle according to the present invention is applied to a tractor, which is an example of the work vehicle, is described with reference to the drawings.

The target route generation system for a work vehicle according to the present invention is applicable to, other than a tractor, passenger work vehicles such as a passenger rice planter, a combine, a passenger mower, a wheel loader, or a snowplow, and an unmanned work vehicle such as an unmanned mower.

Figure 1:
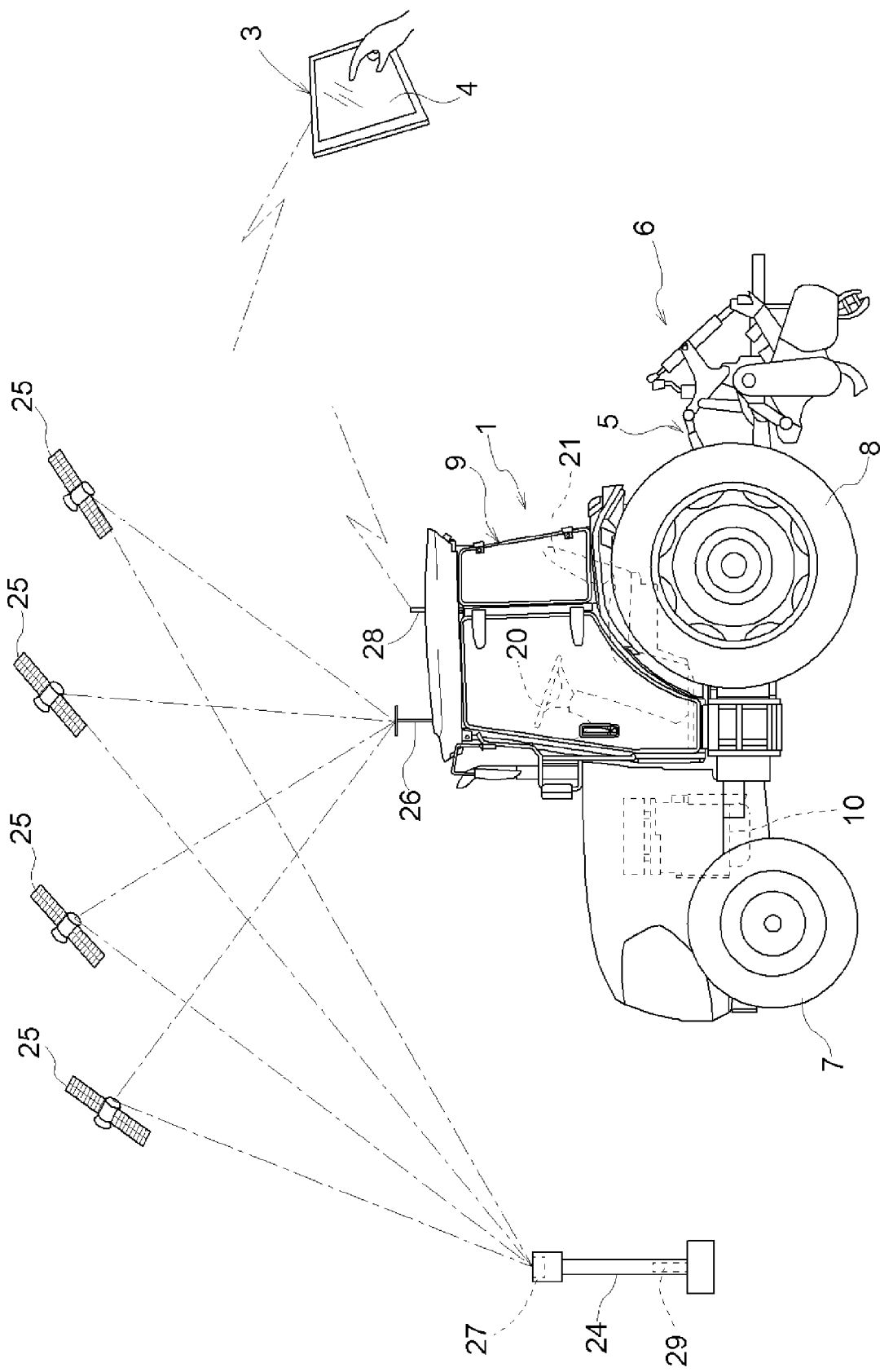
FIG. 1 is a left side view of a tractor.
Figure 2:
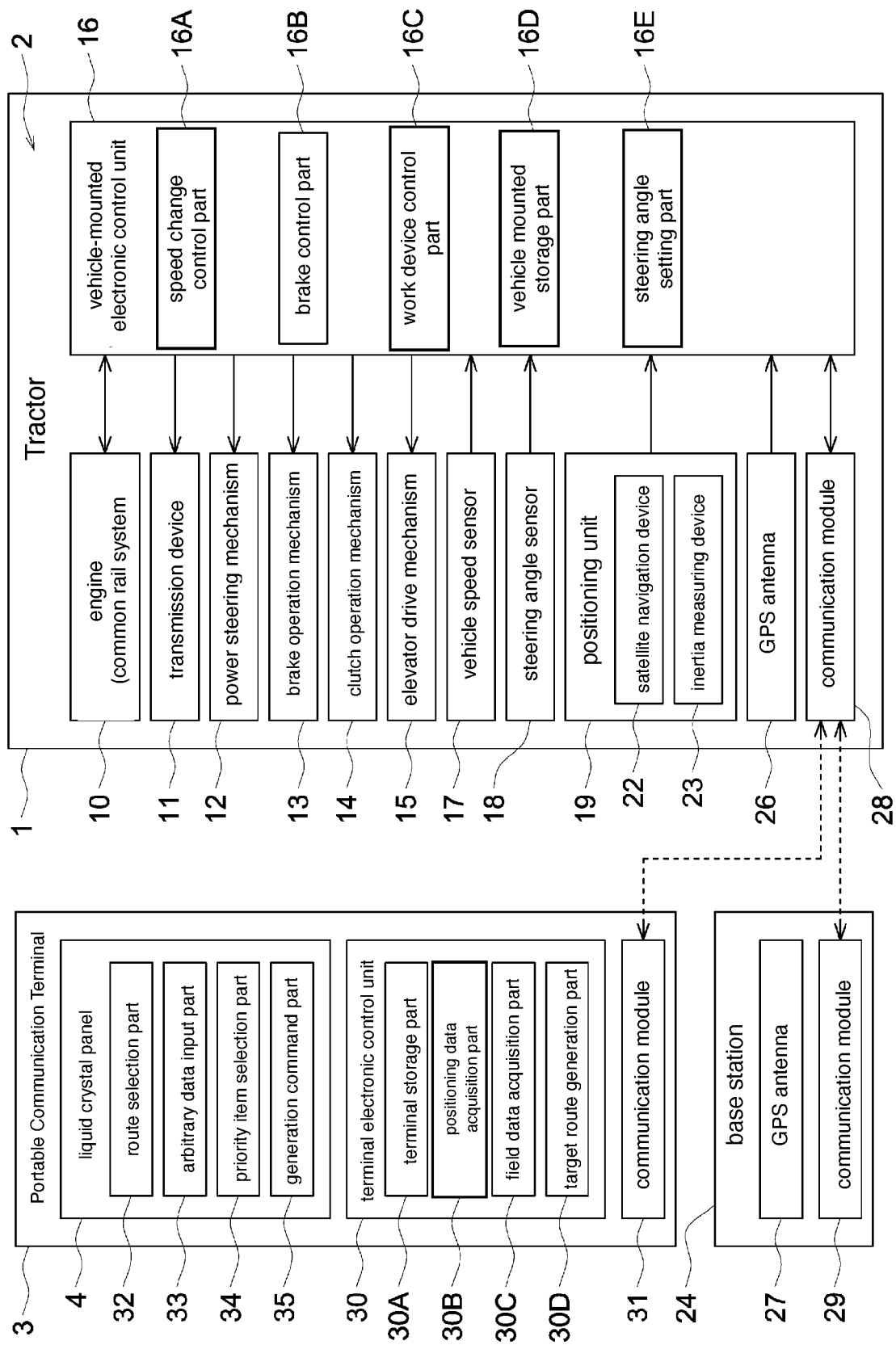
FIG. 2 is a block diagram illustrating a control configuration with regard to the autonomous travel of the tractor.

As illustrated in FIGS. 1 and 2, a tractor 1 exemplified according to the present embodiment is configured to enable the autonomous travel in a field, which is an example of a work area, by using an autonomous travel system for a work vehicle. The autonomous travel system for a work vehicle includes an autonomous travel unit 2 mounted on the tractor 1, and a portable communication terminal 3 that has the communication settings so as to communicate with the autonomous travel unit 2. A tablet-type personal computer including a touchable liquid crystal panel (an example of a display part) 4, or the like, is used for the portable communication terminal 3.

Furthermore, a notebook personal computer or a smartphone may be used for the portable communication terminal 3.

As illustrated in FIG. 1, the tractor 1 is coupled to a rotary tiller 6, which is an example of a work device, in a liftable and rotatable manner via a three-point link mechanism 5 at its rear part. Thus, the tractor 1 is designed to enable rotary tilling.

Furthermore, instead of the rotary tiller 6, the rear part of the tractor 1 may be coupled to a work device such as a plow, a seed planter, or a spraying device.

As illustrated in FIGS. 1 to 2, the tractor 1 includes, for example, right and left front wheels 7 that may be driven and steered, right and left rear wheels 8 that may be driven, a cabin 9 that forms a passenger driving part, an electronically controlled diesel engine (hereinafter referred to as engine) 10 including a common rail system, an electronically controlled transmission device 11 that shifts gears for the power from the engine 10, a full hydraulic power steering mechanism 12 that steers the right and left front wheels 7, right and left parking brakes (not illustrated) that control the right and left rear wheels 8, an electronically controlled brake operation mechanism 13 that enables the hydraulic operation of the right and left parking brakes, a working clutch (not illustrated) that intermittently transmits the power to the rotary tiller 6, an electronically controlled clutch operation mechanism 14 that enables the hydraulic operation of the working clutch, an electrohydraulic controlled elevator drive mechanism 15 that drives and elevates the rotary tiller 6, a vehicle-mounted electronic control unit 16 that stores various control programs, or the like, regarding the autonomous travel, or the like, of the vehicle itself (the tractor) 1, a vehicle speed sensor 17 that detects the vehicle speed of the vehicle itself 1, a steering angle sensor 18 that detects the steering angle of the front wheel 7, and a positioning unit 19 that measures the current position or the current orientation, or the like, of the vehicle itself 1.

Furthermore, an electronically controlled gasoline engine including an electronic governor may be used as the engine 10. A hydromechanical variable transmission (HMT), a hydrostatic variable transmission (HST), or a belt-type variable transmission may be used as the transmission device 11. An electric power steering mechanism including an electric motor may be used as the power steering mechanism 12.

As illustrated in FIG. 1, the cabin 9 includes a steering wheel 20 that enables the manual steering of the right and left front wheels 7 via the power steering mechanism 12, and a seat 21 for a user. Although not illustrated, there are, for example, a speed change lever that enables the manual operation of the transmission device 11, right and left brake pedals that enable the human operation of the right and left parking brakes, and an elevation lever that enables the manual elevation operation of the rotary tiller 6.

As illustrated in FIG. 2, the vehicle-mounted electronic control unit 16 includes for example, a speed change control part 16A that controls the operation of the transmission device 11, a brake control part 16B that controls the operation of the right and left parking brakes, a work device control part 16C that controls the operation of the rotary tiller 6, a non-volatile vehicle mounted storage part 16D that stores, for example, vehicle body data including the minimum turning radius and the working width of the vehicle itself 1 and a previously generated target route P for the autonomous travel, and a steering angle setting part 16E that sets the target steering angle of the right and left front wheels 7 during the autonomous travel and outputs it to the power steering mechanism 12.

As illustrated in FIGS. 1 to 2, the positioning unit 19 includes, for example, a satellite navigation device 22 that uses the GPS (Global Positioning System), which is an example of the global navigation satellite system (GNSS: Global Navigation Satellite System), to measure the current position and the current orientation of the vehicle itself 1, and an inertia measurement device (IMU: Inertial Measurement Unit) 23 that includes, for example, a three-axis gyroscope and a three-direction acceleration sensor to measure the attitude, the orientation, or the like, of the vehicle itself 1. The positioning methods using GPS include, for example, DGPS (Differential GPS: a relative positioning method) and RTK-GPS (Real Time Kinematic GPS: an interference positioning method), and RTK-GPS suitable for the positioning of a movable object is adopted in the present embodiment. Therefore, a base station 24 that enables the positioning using RTK-GPS is provided at a known location around a field.

The tractor 1 and the base station 24 include, respectively, GPS antennas 26, 27 that receive radio waves transmitted from GPS satellites 25, communication modules 28, 29 that enable wireless communications of various types of data including positioning data between the tractor 1 and the base station 24, and the like. This allows the satellite navigation device 22 to measure the current position and the current orientation of the vehicle itself 1 with high accuracy based on the positioning data obtained when the GPS antenna 26 on the tractor side receives a radio wave from the GPS satellite 25 and the positioning data obtained when the GPS antenna 27 on the base station side receives a radio wave from the GPS satellite 25. Furthermore, with the satellite navigation device 22 and the inertia measurement device 23, the positioning unit 19 is able to measure the current position, the current orientation, and the attitude angle (the yaw angle, the roll angle, the pitch angle) of the vehicle itself 1 with high accuracy.

As illustrated in FIG. 2, the portable communication terminal 3 includes, for example, a terminal electronic control unit 30 that stores various control programs for controlling the operation of the liquid crystal panel 4, or the like, and a communication module 31 that enables wireless communications of various types of data with the communication module 28 on the tractor side.

The terminal electronic control unit 30 includes, for example, a terminal storage part (an example of a storage part) 30A that stores, for example, vehicle body data obtained through wireless communications, or the like, with the tractor side, a positioning data acquisition part 30B that acquires positioning data through wireless communications with the tractor side, a field data acquisition part 30C that acquires the field data including the size and the shape of a field from the acquired positioning data, and a target route generation part 30D that generates the target route P for the autonomous travel. Furthermore, when the target route generation mode is selected with the touch operation on the liquid crystal panel 4, the terminal electronic control unit 30 causes the liquid crystal panel 4 to display, for example, a route selection part 32 that prompts the selection of the target route P, an arbitrary data input part 33 to which arbitrary setting data for target route generation is input, a priority item selection part 34 that prompts the selection of a priority item regarding the generation of the target route P, and a generation command part 35 that gives a command to the target route generation part 30D so as to generate the target route P. That is, according to the present embodiment, the portable communication terminal 3 forms a target route generation system to generate the target route P for the autonomous travel of the tractor 1.

The terminal storage part 30A stores the vehicle body data and the field data as the basic data necessary for generating the target route P. The arbitrary setting data input to the arbitrary data input part 33 includes, for example, work area determination points for determining a work area A in the field, an autonomous travel start point ps, an autonomous travel end point pe, a reference work direction Op, and a turning method. The priority items selected by the priority item selection part 34 include the maximization of a working size, the minimization of a non-working travel distance, the optimization of a circling travel route area P1 along the outer periphery of the field, and the avoidance of generation of an overlapped route area P0.

The target route generation part 30D executes the target route generation control when the target route generation mode is selected with the touch operation on the liquid crystal panel 4.

Figure 3:
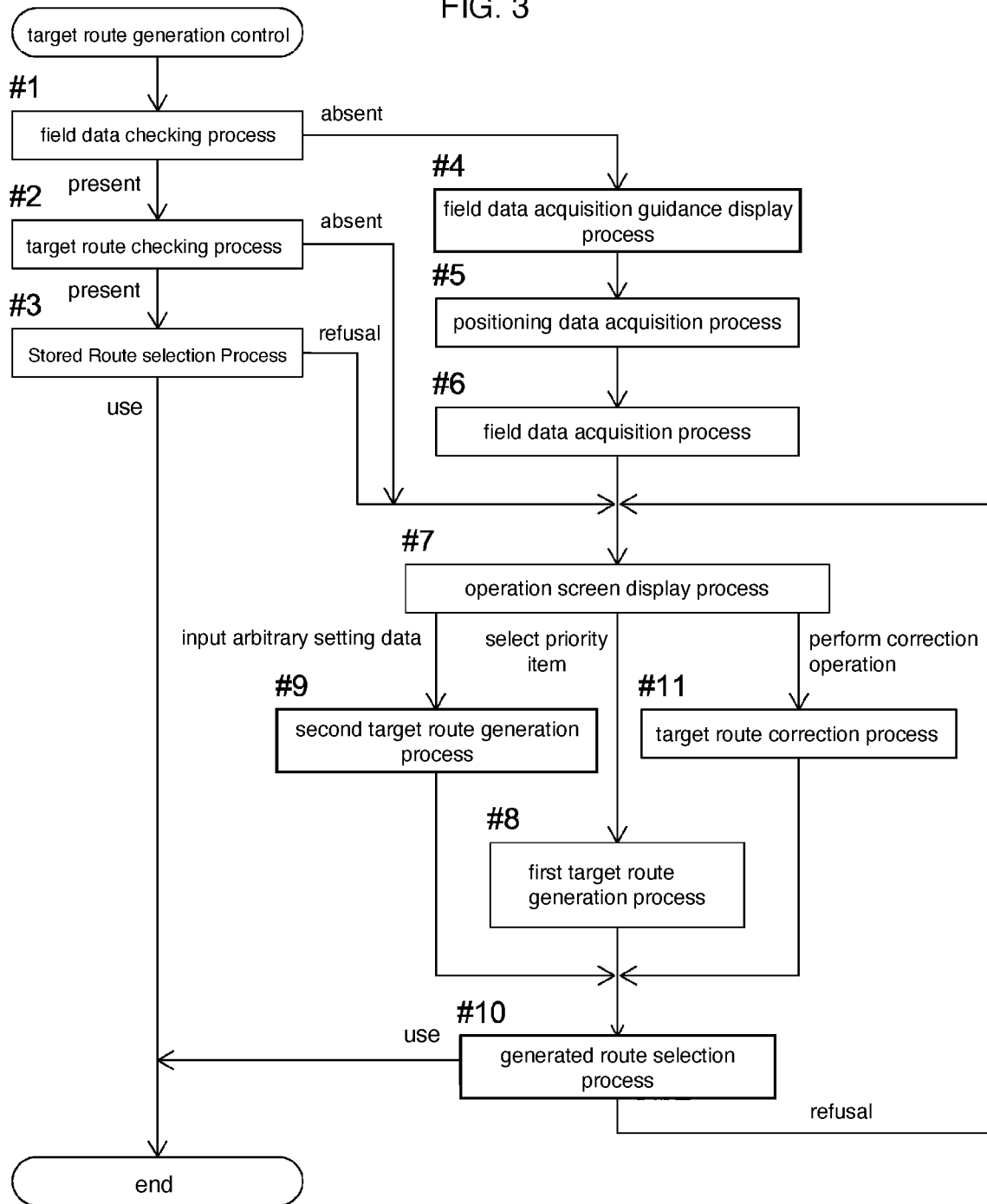
FIG. 3 is a flowchart of target route generation control.

The control operation of the target route generation part 30D during the target route generation control is described below based on the flowchart illustrated in FIG. 3.

During the target route generation control, the target route generation part 30D first performs a field data checking process (step #1) to check whether the terminal storage part 30A stores the corresponding field data based on the current position of the tractor 1 acquired by the positioning data acquisition part 30B in response to the selection of the target route generation mode.

When the corresponding field data is stored in the field data checking process (step #1), a target route checking process (step #2) is performed to check whether the terminal storage part 30A stores the corresponding target route P based on the field data and the vehicle body data stored in the terminal storage part 30A.

When the corresponding target route P is stored in the target route checking process (step #2), the stored target route P is read from the terminal storage part 30A, the read target route P and the above-described route selection part 32 are displayed on the liquid crystal panel 4, and a stored route selection process (step #3) is performed to prompt the user to make a selection as to whether the read target route P is to be used. Then, when the use of the read target route P is selected by the user, the target route generation control is terminated.

When the corresponding field data is not stored in the field data checking process (step #1), a field data acquisition guidance display process (step #4) is performed to cause the liquid crystal panel 4 to display the execution guidance for the field data acquisition travel so as to obtain the field data so that the user is caused to conduct the field data acquisition travel to travel in the tractor 1 along the outer periphery of the field. Furthermore, the positioning data acquisition part 30B is caused to perform a positioning data acquisition process (step #5) to acquire the positioning data measured by the positioning unit 19 of the tractor 1 during the field data acquisition travel through the wireless communications with the tractor side. Then, the field data acquisition part 30C is caused to perform a field data acquisition process (step #6) to acquire the field data including the size or the shape of the field from the positioning data acquired by the positioning data acquisition part 30B. Thus, the field data on the field corresponding to the current position of the tractor 1 is acquired.

When the corresponding target route P is not stored in the target route checking process (step #2), when the refusal of the target route P read in the stored route selection process (step #3) is selected by the user, or when the field data is acquired in the field data acquisition process (step #6), an operation screen display process (step #7) is performed to cause the liquid crystal panel 4 to display the arbitrary data input part 33, the priority item selection part 34, the generation command part 35, described above, and the like, together with the shape, or the like, of the field included in the field data. Thus, the user is caused to input arbitrary setting data or select a priority item with regard to the generation of the target route P.

When the user selects a priority item in the priority item selection part 34 without inputting arbitrary setting data in the arbitrary data input part 33 and then executes a command operation in the generation command part 35 during the operation screen display process (step #7), a first target route generation process (step #8) is performed to generate a first target route corresponding to the priority item as the target route P based on the above-described vehicle body data, the field data, and the selected priority item.

When the user inputs each set of arbitrary setting data in the arbitrary data input part 33 without selecting any priority item in the priority item selection part 34 and then executes a command operation in the generation command part 35 during the operation screen display process (step #7), a second target route generation process (step #9) is performed to generate, as the target route P, a second target route based on the above-described vehicle body data, the field data, and each set of input arbitrary setting data.

After the target route P is generated in each of the above-described target route generation processes (steps #8 to #9), the generated target route P is displayed on the liquid crystal panel 4 together with the shape of the field, the above-described route selection part 32, and the like, and a generated route selection process (step #10) is performed to cause the user to select whether the generated target route P is to be used.

When the use of the generated target route P is selected by the user in the generated route selection process (step #10), the target route generation control is terminated.

When the user selects the refusal of the generated target route P in the generated route selection process (step #10), the operation screen display process (step #7) is returned so that the user is again caused to input arbitrary setting data in the arbitrary data input part 33 or select a priority item in the priority item selection part 34. Furthermore, in the operation screen display process (step #7) here, when the user performs a correction operation such as the input of corrected or added arbitrary setting data in the arbitrary data input part 33 or the additional selection of a priority item in the priority item selection part 34, and then executes a command operation in the generation command part 35, a transition is made to the target route correction process (step #11) so that the previously generated target route P is corrected based on the currently input arbitrary setting data or the currently selected priority item and then a transition is made to the generated route selection process (step #10).

Next, with reference to FIG. 2 and FIGS. 4 to 19, the generation of the target route P during the first target route generation process or the second target route generation process by the target route generation part 30D is described in detail.

Figure 4:
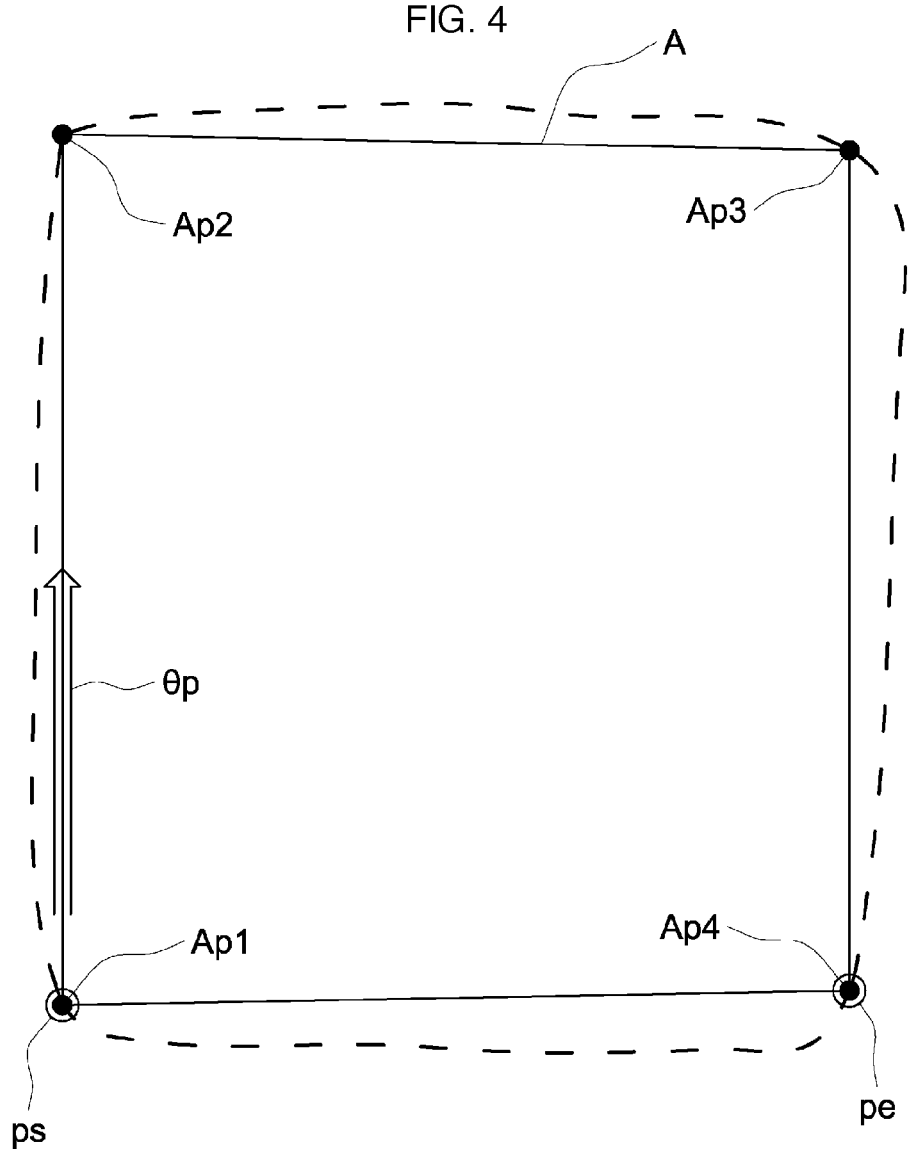
FIG. 4 is a diagram illustrating determination of a work area and selection of a reference work direction, and the like, by a target route generation part.

During the first target route generation process, the target route generation part 30D first automatically selects a plurality of work area determination points (four work area determination points Ap1 to Ap4 in FIG. 4) for determining the work area A suitable for the shape of the field (e.g., the outer periphery shape of the field indicated by a broken line in FIG. 4) based on the above-described vehicle body data, the field data, and the selected priority item so as to determine the work area A and then causes the liquid crystal panel 4 to display the selected work area determination points Ap1 to Ap4 and the determined work area A together with the shape of the field, or the like, so as to give a notification to the user (see FIG. 4).

If there is a large number of work area determination points to determine the work area A, there is an increase in the control load required for determining the work area A although the work area A may be determined in accordance with the shape of the field. Furthermore, the work area A determined in accordance with the shape of the field is not always suitable for the generation of the target route P for the autonomous travel of the tractor 1, and there is a need to select work area determination points so as to properly simplify the work area A in accordance with the shape of the field in consideration of the working width of the tractor 1, etc. Therefore, the number of selectable work area determination points are limited to a predetermined number (e.g., 30 points) so that it is possible to determine the work area A suitable for the shape of the field while preventing excessive control loads.

Subsequently, the reference work direction $\theta p$, the autonomous travel start point ps, and the autonomous travel end point pe are automatically selected in consideration of the priority items, and the like, and the selected reference work direction $\theta p$, the autonomous travel start point ps, and the autonomous travel end point pe are displayed on the liquid crystal panel 4 together with the work area A so as to give a notification to the user (see FIG. 4).

Then, based on the determined work area A and the selected reference work direction $\theta p$, the autonomous travel start point ps, and the autonomous travel end point pe, the first target route is generated as the target route P corresponding to the priority item, and the generated first target route is displayed on the liquid crystal panel 4 together with the work area A, and the like, so as to give a notification to the user.

When the input of the work area determination points for determining the work area A is selected in accordance with the user's touch operation on the arbitrary data input part 33 (see FIG. 2) so that the plurality of work area determination points (the four work area determination points Ap1 to Ap4 in FIG. 4) are arbitrarily input, the target route generation part 30D determines the work area A based on the arbitrarily input work area determination points Ap1 to Ap4 and causes the liquid crystal panel 4 to display the arbitrarily input work area determination points Ap1 to Ap4 and the determined work area A together with the shape of the field, or the like, so as to give a notification to the user (see FIG. 4).

Furthermore, when the input of the reference work direction $\theta p$ is selected in accordance with the user's touch operation on the arbitrary data input part 33 so that the reference work direction $\theta p$ is arbitrarily input, the arbitrarily input reference work direction $\theta p$ is displayed together with the work area A, and the like, on the liquid crystal panel 4 and is notified of the user (see FIG. 4).

Moreover, when the inputs of the autonomous travel start point ps and the autonomous travel end point pe are selected in accordance with the user's touch operation on the arbitrary data input part 33 so that the autonomous travel start point ps and the autonomous travel end point pe are arbitrarily input, the arbitrarily input autonomous travel start point ps and the arbitrarily input autonomous travel end point pe are displayed together with the work area A, or the like, on the liquid crystal panel 4 and are notified of the user (see FIG. 4).

Then, when a command is received from the generation command part 35 in accordance with the user's operation on the generation command part 35 (see FIG. 2), the second target route is generated as the target route P based on the determined work area A and the arbitrarily input reference work direction θp, the arbitrarily input autonomous travel start point ps, and the arbitrarily input autonomous travel end point pe during the second target route generation process, and the generated second target route is displayed together with the work area A, and the like, on the liquid crystal panel 4 and is notified of the user.

Figure 5:
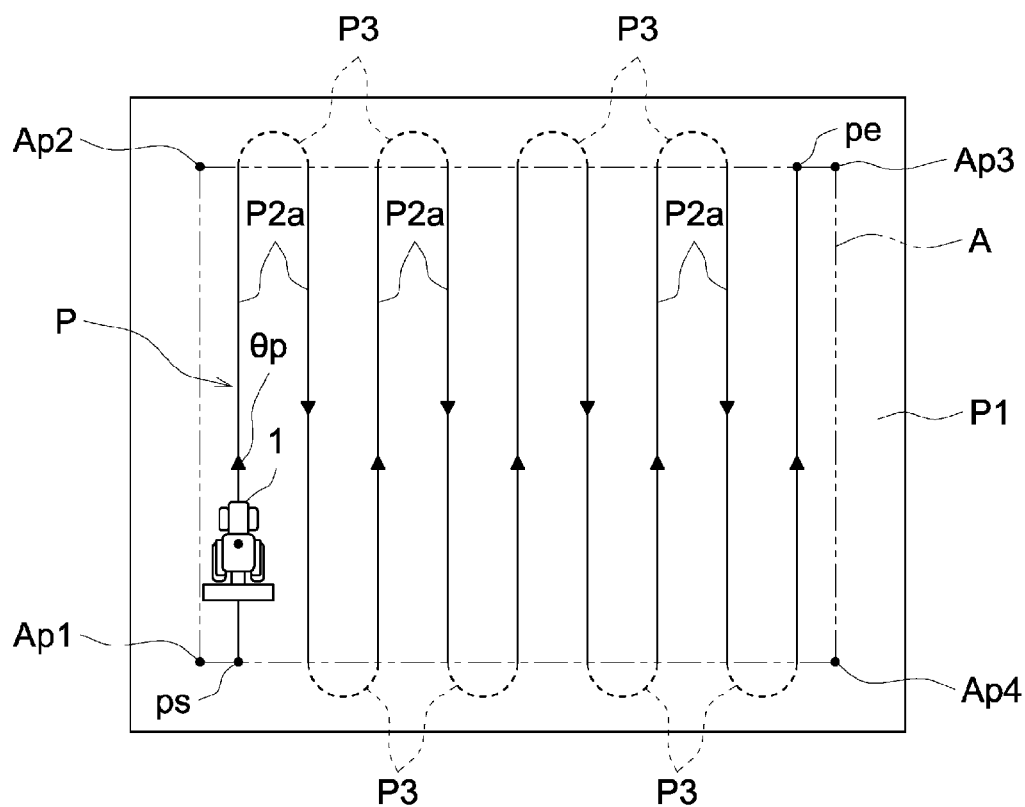
FIG. 5 is a diagram illustrating a first example route among the target routes generated by the target route generation part.
Figure 6:
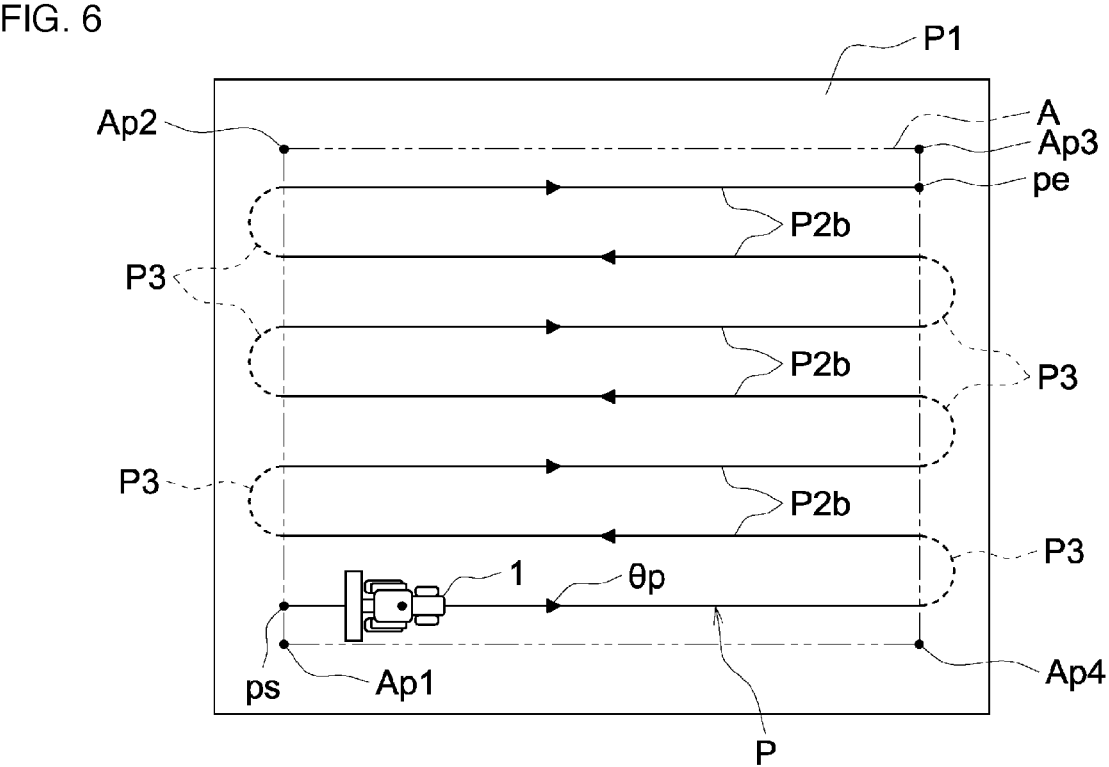
FIG. 6 is a diagram illustrating a second example route among the target routes generated by the target route generation part.

For example, in accordance with the user's operation on the rectangular field illustrated in FIGS. 5 to 6 during the operation screen display process, as illustrated in FIG. 5, when the work area determination points (the four work area determination points Ap1 to Ap4 in FIGS. 5 to 6) for determining the rectangular work area A that may ensure the circling travel route area (circling travel area) P1 in the interval with the outer periphery of the field are arbitrarily input, the autonomous travel start point ps and the autonomous travel end point pe corresponding to the entrance and the exit of the field are arbitrarily input, and the reference work direction θp in a direction along the short side of the work area A is arbitrarily input, and then a command is received from the generation command part 35, the target route generation part 30D generates the second target route illustrated in FIG. 5 as the target route P during the second target route generation process. Then, during the generated route selection process, the generated second target route is displayed together with the above-described route selection part 32, or the like, on the liquid crystal panel 4 so that the user is caused to make a selection as to whether the generated second target route is to be used.

The second target route illustrated in FIG. 5 includes a plurality of first straight work route areas P2a that have the same length as the short side of the work area A and are arranged to be parallel at intervals of a certain distance corresponding to the working width, and a plurality of direction change route areas P3 that extend from the end point to the start point of the adjacent first straight work route areas P2a, which allows the autonomous travel of the tractor 1 from the autonomous travel start point ps to the autonomous travel end point pe that are arbitrarily input by the user.

For example, in accordance with the user's operation on the rectangular field illustrated in FIGS. 5 to 6 during the operation screen display process, as illustrated in FIG. 6, when the plurality of work area determination points (the four work area determination points Ap1 to Ap4 in FIGS. 5 to 6) for determining the rectangular work area A that may ensure the circling travel route area (circling travel area) P1 in the interval with the outer periphery of the field are arbitrarily input, the autonomous travel start point ps and the autonomous travel end point pe corresponding to the entrance and the exit of the field are arbitrarily input, the reference work direction θp in a direction along the long side of the work area A is arbitrarily input, and then a command is received from the generation command part 35, the target route generation part 30D generates the second target route illustrated in FIG. 6 as the target route P during the second target route generation process. Then, during the generated route selection process, the generated second target route is displayed together with the above-described route selection part 32, or the like, on the liquid crystal panel 4 so that the user is caused to make a selection as to whether the generated second target route is to be used.

The second target route illustrated in FIG. 6 includes a plurality of second straight work route areas P2b that have the same length as the long side of the work area A and are arranged to be parallel at intervals of a certain distance corresponding to the working width, and a plurality of direction change route areas P3 that extend from the end point to the start point of the adjacent second straight work route areas P2b so as to enable the autonomous travel of the tractor 1 from the autonomous travel start point ps to the autonomous travel end point pe that are arbitrarily input by the user.

Thus, in the second target route illustrated in FIG. 6 as compared with the second target route illustrated in FIG. 5, it is possible to achieve a reduction in the consumption of fuel and a reduction in the working time due to a smaller number of the direction change route areas P3 and a shorter traveling distance of the tractor 1. Furthermore, it is possible to achieve a reduction in the loads required for generating the target route P due to a smaller number of route areas forming the target route P.

For example, in accordance with the user's operation on the rectangular field illustrated in FIGS. 5 to 6 during the operation screen display process, when the optimization of the circling travel route area P1 is selected as a priority item and then a command is received from the generation command part 35, the target route generation part 30D automatically determines the plurality of work area determination points (the four work area determination points Ap1 to Ap4 in FIGS. 5 to 6), the autonomous travel start point ps, the autonomous travel end point pe, and the like, so as to obtain the rectangular work area A that may ensure the circling travel route area (circling travel area) P1 in the interval with the outer periphery of the field and generates two types of first target routes illustrated in FIGS. 5 to 6 as the target route P corresponding to the optimization of the circling travel route area P1 during the first target route generation process as illustrated in FIGS. 5 to 6. Then, during the generated route selection process, the two types of generated first target routes are displayed together with the above-described route selection part 32, or the like, on the liquid crystal panel 4 so that the user is caused to make a selection as to whether the two types of generated first target routes is to be used.

The first target route illustrated in FIG. 5 includes the plurality of first straight work route areas P2a and the plurality of direction change route areas P3 described above so as to enable the autonomous travel of the tractor 1 from the autonomous travel start point ps to the autonomous travel end point pe determined by the target route generation part 30D.

The first target route illustrated in FIG. 6 includes the plurality of second straight work route areas P2b and the plurality of direction change route areas P3 described above so as to enable the autonomous travel of the tractor 1 from the autonomous travel start point ps to the autonomous travel end point pe determined by the target route generation part 30D.

In this case, the user may make a selection on the route selection part 32 as to whether the two types of first target routes are to be used as the target route P. Furthermore, in a case where one of the first target routes is selected as the target route P, after the tilling work is performed due to the autonomous travel of the tractor 1 at the work area A on the center side of the field, the width of the circling travel route area P1, which is the remaining unworked area in the neighborhood, may be the same or substantially the same as the integral multiple of the working width. Accordingly, it is easy to perform the circling work travel of the tractor 1 due to the manual drive or the autonomous travel of the tractor 1.

Here, with respect to the first target routes illustrated in FIGS. 5 to 6, for example, when the user desires to switch the positions of the autonomous travel start point ps and the autonomous travel end point pe in view of the relationships with the entrance and the exit for the tractor 1 in the field, the refusal of the first target routes illustrated in FIGS. 5 to 6 are selected by the route selection part 32, the corrected arbitrary setting data for switching the positions of the autonomous travel start point ps and the autonomous travel end point pe are input, and then a command operation is performed by the generation command part 35 so that, in the target route correction process by the target route generation part 30D based on the above, the first target routes may be generated in which the positions of the autonomous travel start point ps and the autonomous travel end point pe in the first target routes illustrated in FIGS. 5 to 6 have been switched.

For example, in accordance with the user's operation on the rectangular field illustrated in FIGS. 5 to 6 during the operation screen display process, when the maximization of the working size and the optimization of the circling travel route area are selected as priority items and then a command is received from the generation command part 35, the target route generation part 30D generates two types of first target routes illustrated in FIGS. 5 to 6 as the target route P during the first target route generation process. Then, during the generated route selection process, the two types of generated first target routes are displayed together with the above-described route selection part 32, and the like, on the liquid crystal panel 4 so that the user is caused to make a selection as to whether the two types of generated first target routes are to be used.

For example, in accordance with the user's operation on the rectangular field illustrated in FIGS. 5 to 6 during the operation screen display process, when the minimization of the non-working travel distance and the optimization of the circling travel route area are selected as priority items and then a command is received from the generation command part 35, the target route generation part 30D automatically determines the plurality of work area determination points (the four work area determination points Ap1 to Ap4 in FIGS. 5 to 6), the autonomous travel start point ps, the autonomous travel end point pe, the reference work direction θp, and the like, and generates the first target route illustrated in FIG. 6 as the target route P so as to obtain the rectangular work area A that may ensure the circling travel route area (circling travel area) P1 in the interval with the outer periphery of the field and minimize the non-working travel distance included in the autonomous travel distance during the first target route generation process illustrated in FIG. 6. Then, during the generated route selection process, the generated first target route is displayed together with the above-described route selection part 32, or the like, on the liquid crystal panel 4 so that the user is caused to make a selection as to whether the generated first target route is to be used.

The first target route illustrated in FIG. 6 includes the plurality of second straight work route areas P2b and the plurality of direction change route areas P3 described above so as to enable the autonomous travel of the tractor 1 from the autonomous travel start point ps to the autonomous travel end point pe determined by the target route generation part 30D.

In this case, in the first target route illustrated in FIG. 6 as compared with the first target route illustrated in FIG. 5, it is possible to achieve the minimization of the non-working travel distance due to a reduction in the number of the direction change route areas P3. Furthermore, after the tilling work is performed due to the autonomous travel of the tractor 1 at the work area A on the center side of the field, the width of the circling travel route area P1, which is the remaining unworked area in the neighborhood, may be the same or substantially the same as the integral multiple of the working width. Accordingly, it is possible to achieve a reduction in the consumption of fuel, a reduction in the working time, and the like, due to a reduction in the non-working travel distance, and it is easy to perform the circling work travel of the tractor 1 due to the manual drive or the autonomous travel of the tractor 1.

For example, in accordance with the user's operation on the rectangular field illustrated in FIGS. 5 to 6 during the operation screen display process, when the maximization of the working size, the minimization of the non-working travel distance, and the optimization of the circling travel route area are selected as priority items and then a command is received from the generation command part 35, the target route generation part 30D generates the first target route illustrated in FIG. 6 as the target route P during the first target route generation process. Then, during the generated route selection process, the generated first target route is displayed together with the above-described route selection part 32, and the like, on the liquid crystal panel 4 so that the user is caused to make a selection as to whether the generated first target route is to be used.

Figure 7:
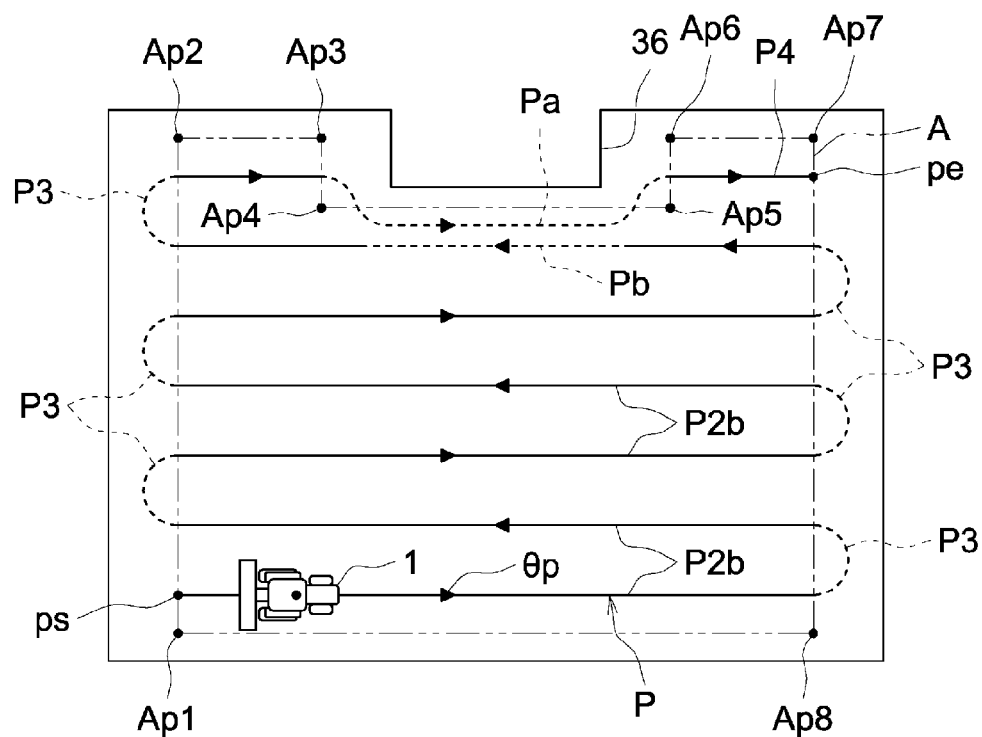
FIG. 7 is a diagram illustrating a third example route among the target routes generated by the target route generation part.
Figure 8:
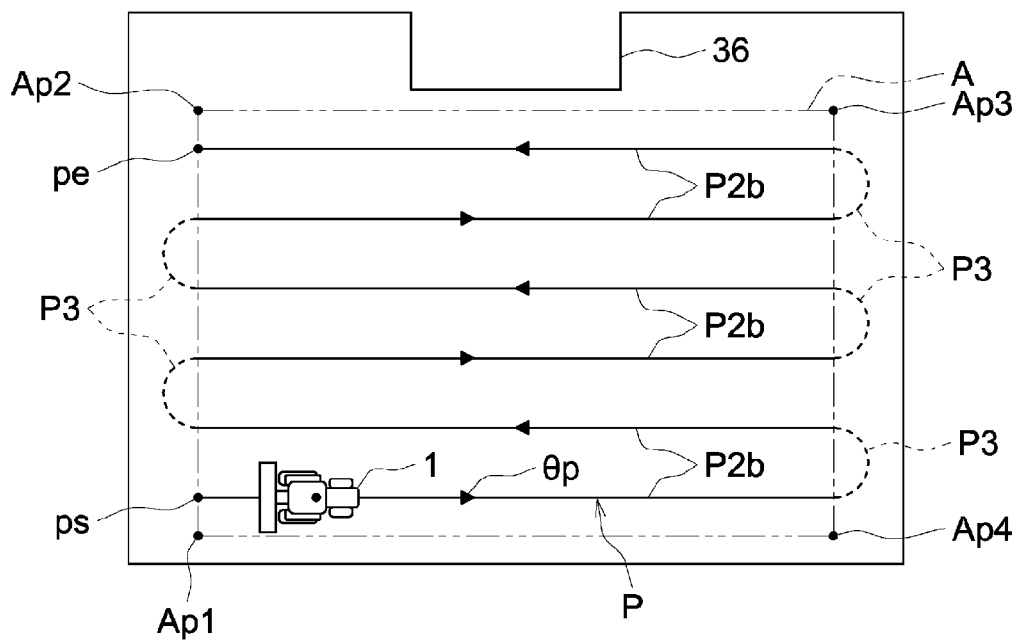
FIG. 8 is a diagram illustrating a fourth example route among the target routes generated by the target route generation part.

For example, in accordance with the user's operation on a recessed field including a projection portion 36 illustrated in FIGS. 7 to 8 during the operation screen display process, as illustrated in FIG. 7, when the plurality of work area determination points (the eight work area determination points Ap1 to Ap4 in FIG. 7) for determining the recessed shape of the work area A substantially along the outer periphery of the field so as to maximize the work area A are arbitrarily input, the autonomous travel start point ps and the autonomous travel end point pe corresponding to the entrance and the exit of the field are arbitrarily input, the reference work direction θp in a direction along the long side of the work area A is arbitrarily input, and then a command is received from the generation command part 35, the target route generation part 30D generates the second target route illustrated in FIG. 7 as the target route P during the second target route generation process. Then, during the generated route selection process, the generated second target route is displayed together with the above-described route selection part 32, or the like, on the liquid crystal panel 4 so that the user is caused to make a selection as to whether the generated second target route is to be used.

The second target route illustrated in FIG. 7 includes the plurality of above-described second straight work route areas P2b, a detour work route area P4 that includes a detour route area Pa to make a detour around the projection portion 36 during the interrupted tilling work and that is adjacent to the last second straight work route area P2b, and the plurality of direction change route areas P3 that extend from the end point to the start point of the adjacent second straight work route area P2b and the detour work route area P4 so as to enable the autonomous travel of the tractor 1 from the autonomous travel start point ps to the autonomous travel end point pe that are arbitrarily input by the user.

In this case, in the last second straight work route area P2b, the route area adjacent to the detour route area Pa is an unworked area Pb that is crushed during the autonomous travel of the tractor 1 in the detour route area Pa, and therefore there is a decrease in the final working size.

For example, in accordance with the user's operation on the recessed field including the projection portion 36 illustrated in FIGS. 7 to 8 during the operation screen display process, when the maximization of the working size is selected as a priority item and then a command is received from the generation command part 35, the target route generation part 30D first determines a difference in the work area caused due to the presence or absence of the detour work route area P4 illustrated in FIG. 7 during the first target route generation process.

Furthermore, if there is an increase in the work area due to the presence of the detour work route area P4, as illustrated in FIG. 7, the plurality of work area determination points (the eight work area determination points Ap1 to Ap8 in FIG. 7), the autonomous travel start point ps, the autonomous travel end point pe, the reference work direction θp, and the like, are automatically determined and the first target route illustrated in FIG. 7 is generated as the target route P so as to obtain the wide and recessed work area A substantially along the outer periphery of the field enabling the generation of the detour work route area P4. Then, during the generated route selection process, the generated first target route is displayed together with the above-described route selection part 32, or the like, on the liquid crystal panel 4 so that the user is caused to make a selection as to whether the generated first target route is to be used.

Conversely, if there is a decrease in the work area due to the presence of the detour work route area P4, as illustrated in FIG. 8, the plurality of work area determination points (the four work area determination points Ap1 to Ap4 in FIG. 8), the autonomous travel start point ps, the autonomous travel end point pe, the reference work direction θp, and the like, are automatically determined and the first target route illustrated in FIG. 8 is generated as the target route P so as to obtain the rectangular and narrow work area A in which the detour work route area P4 is not generated. Then, during the generated route selection process, the generated first target route is displayed together with the above-described route selection part 32, or the like, on the liquid crystal panel 4 so that the user is caused to make a selection as to whether the generated first target route is to be used.

The first target route illustrated in FIG. 7 includes the plurality of second straight work route areas P2b, the detour work route area P4, and the plurality of direction change route areas P3 described above so as to enable the autonomous travel of the tractor 1 from the autonomous travel start point ps to the autonomous travel end point pe determined by the target route generation part 30D.

The first target route illustrated in FIG. 8 includes the plurality of second straight work route areas P2b and the plurality of direction change route areas P3 as described above so as to enable the autonomous travel of the tractor 1 from the autonomous travel start point ps to the autonomous travel end point pe determined by the target route generation part 30D.

For example, in accordance with the user's operation on the recessed field including the projection portion 36 illustrated in FIGS. 7 to 8 during the operation screen display process, when the minimization of the non-working travel distance is selected as a priority item and then a command is received from the generation command part 35, the target route generation part 30D generates, as the target route P, the first target route that does not include the detour work route area P4 illustrated in FIG. 8 during the first target route generation process. Then, during the generated route selection process, the generated first target route is displayed together with the above-described route selection part 32, or the like, on the liquid crystal panel 4 so that the user is caused to make a selection as to whether the generated first target route is to be used.

That is, when the first target route (the target route P) is generated for the recessed field including the projection portion 36 illustrated in FIGS. 7 to 8 during the first target route generation process, the target route generation part 30D determines, at the stage for determining the work area A, whether it is desirable to determine the recessed and wide work area A (see FIG. 7) requiring the detour work route area P4 or it is desirable to determine the rectangular and narrow work area A (see FIG. 8) eliminating the detour work route area P4, when it is desirable to determine the recessed and wide work area A, the large number of the work area determination points (the eight work area determination points Ap1 to Ap8 in FIG. 7) necessary for the determination are selected, and then the first target route is generated as described above. Conversely, when it is desirable to determine the rectangular and narrow work area A, the small number of the work area determination points (the four work area determination points Ap1 to Ap4 in FIG. 8) necessary for the determination are selected, and then the first target route is generated as described above.

Figure 9:
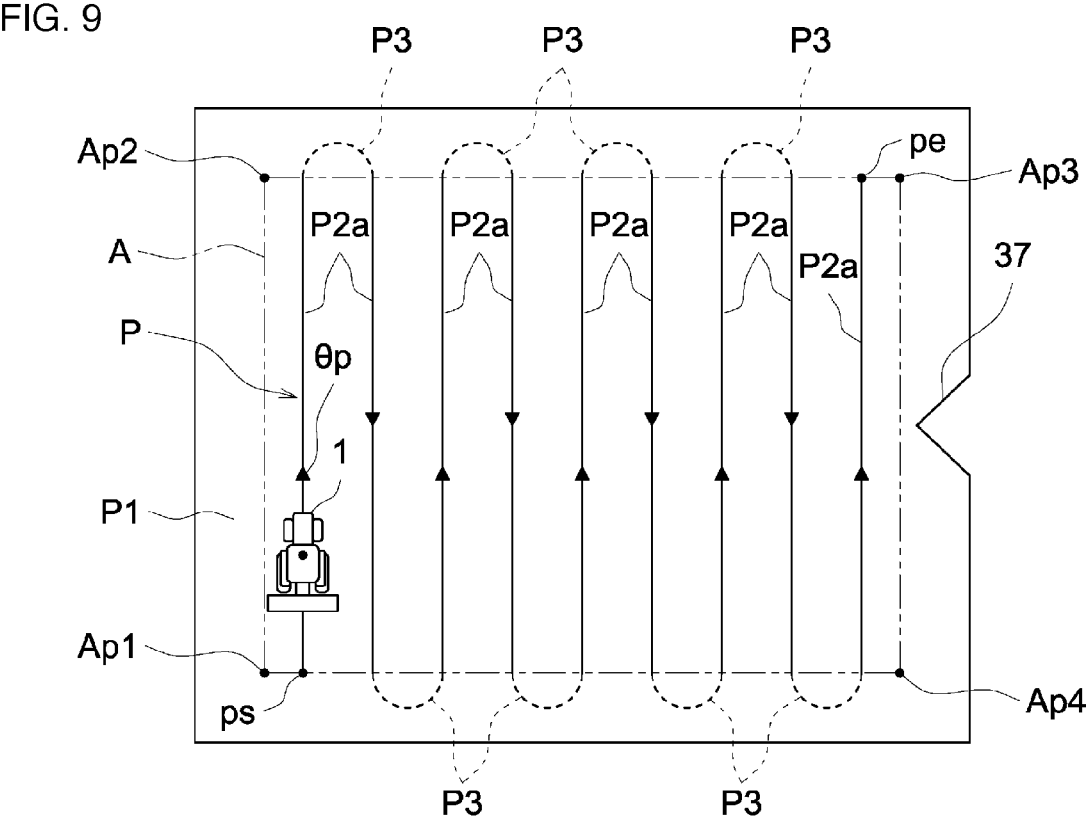
FIG. 9 is a diagram illustrating a fifth example route among the target routes generated by the target route generation part.

For example, in accordance with the user's operation on the substantially rectangular field including a projection portion 37 illustrated in FIGS. 9 to 12 during the operation screen display process, when the optimization of the circling travel route area is selected as a priority item and then a command is received from the generation command part 35, the target route generation part 30D automatically determines the plurality of work area determination points (the four work area determination points Ap1 to Ap4 in FIGS. 9 to 12), the autonomous travel start point ps, the autonomous travel end point pe, and the like, so as to obtain the rectangular work area A that may ensure the circling travel route area (circling travel area) P1 in the interval with the outer periphery of the field and generates the first target route, or the like, illustrated in FIG. 9 as the target route P corresponding to the optimization of the circling travel route area P1 during the first target route generation process. Then, during the generated route selection process, the generated first target route is displayed together with the above-described route selection part 32, or the like, on the liquid crystal panel 4 so that the user is caused to make a selection as to whether the generated first target route is to be used.

Figure 10:
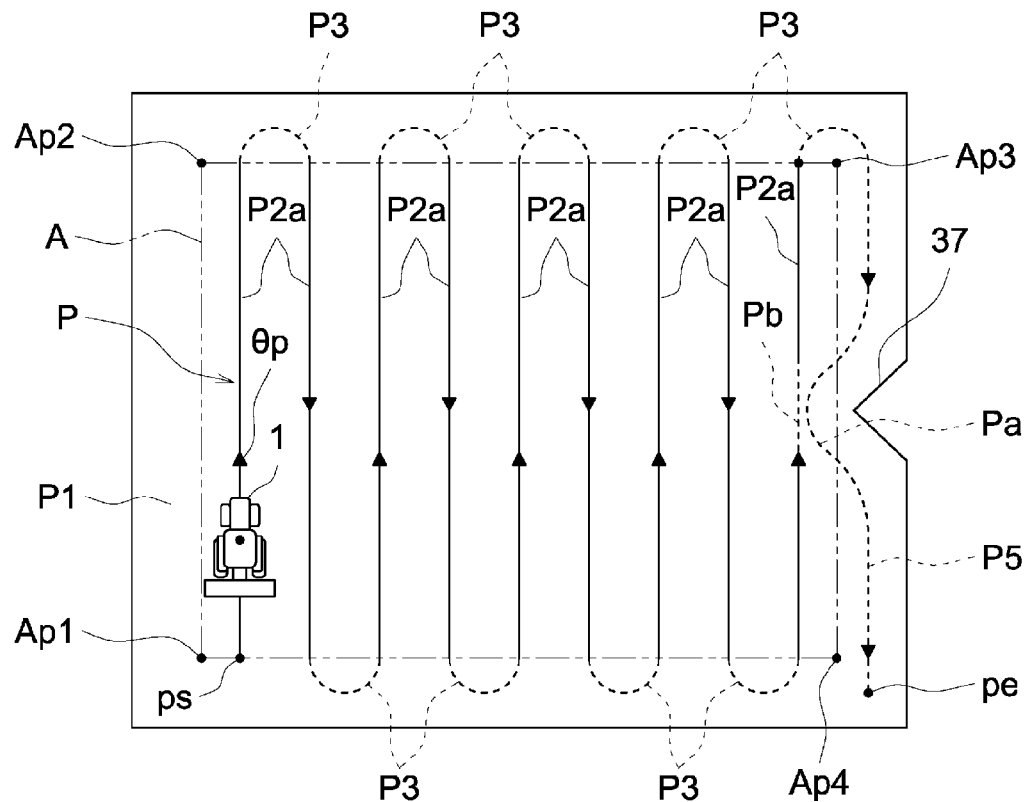
FIG. 10 is a diagram illustrating a sixth example route among the target routes generated by the target route generation part.
Figure 11:
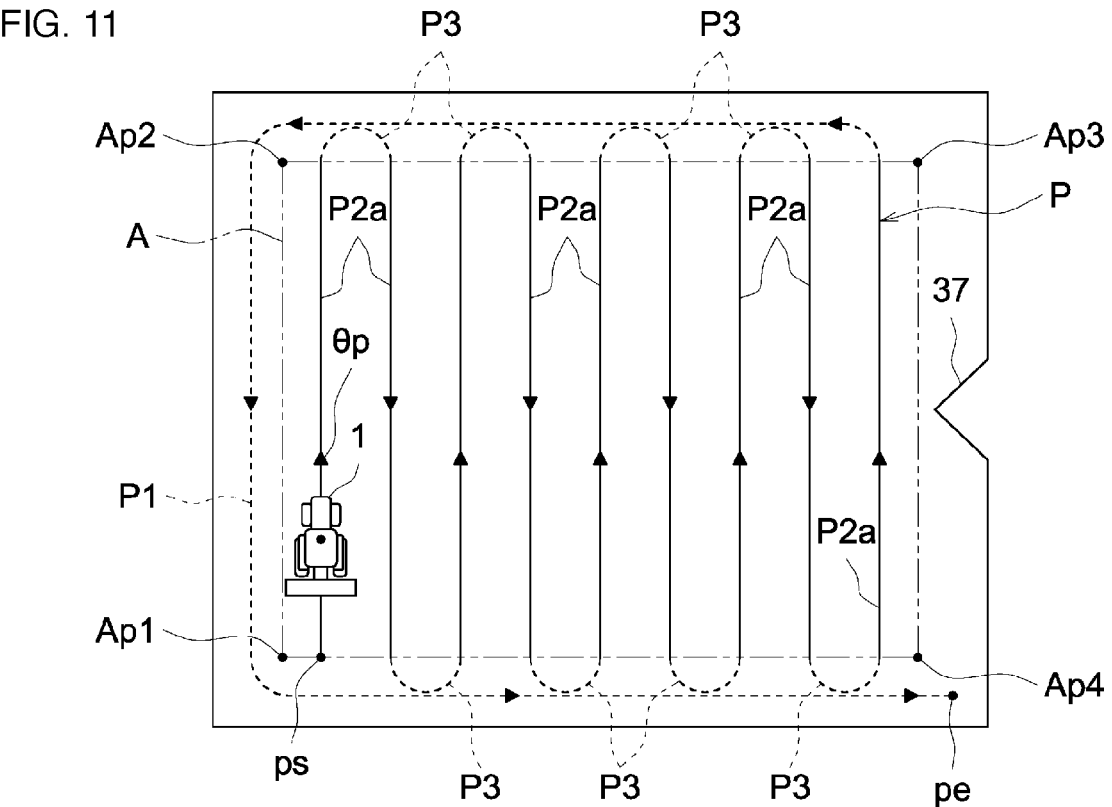
FIG. 11 is a diagram illustrating a seventh example route among the target routes generated by the target route generation part.
Figure 12:
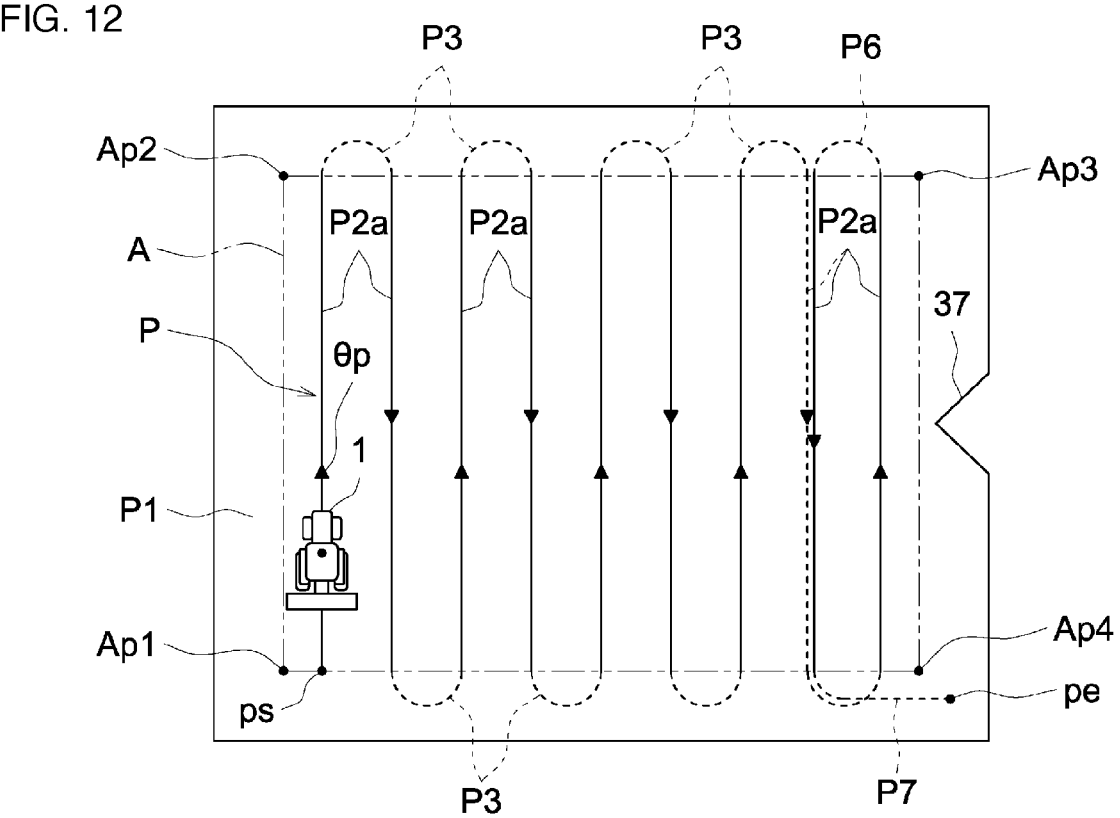
FIG. 12 is a diagram illustrating an eighth example route among the target routes generated by the target route generation part.

Here, with respect to the first target route illustrated in FIG. 9, for example, when the user desires to change the position of the autonomous travel end point pe illustrated in FIG. 9 to the position illustrated in FIGS. 10 to 12 in view of the relationships with the entrance and the exit for the tractor 1 in the field, the refusal of the first target route, or the like, illustrated in FIG. 9 is selected by the route selection part 32, the reference work direction θp is determined to be in the direction along the short side of the work area A, the corrected arbitrary setting data for changing the position of the autonomous travel end point pe to the position illustrated in FIGS. 10 to 12 is input, and then a command operation is performed by the generation command part 35 so that, in the target route correction process by the target route generation part 30D based on the above, three types of first target routes illustrated in for example FIGS. 10 to 12 may be generated as the first target routes corresponding to the changed autonomous travel end point pe.

The first target route illustrated in FIG. 10 includes the plurality of above-described first straight work route areas P2a, a detour move route area P5 that includes the detour route area Pa to make a detour around the projection portion 37 and that is adjacent to the last first straight work route area P2a, and the plurality of direction change route areas P3 that extend from the end point to the start point of the adjacent first straight work route areas P2a and the detour move route area P5 so as to enable the autonomous travel of the tractor 1 from the autonomous travel start point ps determined by the target route generation part 30D to the autonomous travel end point pe corrected and input by the user.

The first target route illustrated in FIG. 11 includes the plurality of above-described first straight work route areas P2a, the direction change route areas P3 extending from the end point to the start point of the adjacent first straight work route areas P2a, and the circling travel route area P1 from the end point of the last first straight work route area P2a to the autonomous travel end point pe so as to enable the autonomous travel of the tractor 1 from the autonomous travel start point ps determined by the target route generation part 30D to the autonomous travel end point pe corrected and input by the user.

The first target route illustrated in FIG. 12 includes the plurality of above-described first straight work route areas P2a, the plurality of direction change route areas P3 extending from the end point to the start point of the adjacent first straight work route areas P2a, a single return direction change route area P6 that extends from the end point of the last first straight work route area P2a to the start point of the previous first straight work route area P2a adjacent to the last first straight work route area P2a, and a move route area P7 that extends from the end point of the previous first straight work route area P2a to the autonomous travel end point pe so as to have the route setting such that the first moving travel and the second working travel are executed in the previous first straight work route area P2a and so as to enable the autonomous travel of the tractor 1 from the autonomous travel start point ps determined by the target route generation part 30D to the autonomous travel end point pe corrected and input by the user.

In this case, the user may make a selection on the route selection part 32 as to whether three types of first target routes are to be used as the target route P during the generated route selection process by the target route generation part 30D.

In a case where the first target route illustrated in FIG. 10 is selected as the target route P, the non-working travel distance in the target route P is relatively short, and therefore it is possible to achieve a reduction in the fuel consumption, a reduction in the working time, and the like, due to a reduction in the non-working travel distance. On the other hand, in the last first straight work route area P2a, the route section adjacent to the detour route area Pa is the unworked area Pb that is crushed during the autonomous travel of the tractor 1 in the detour route area Pa, and therefore there is a decrease in the final working size.

In a case where the first target route illustrated in FIG. 11 is selected as the target route P, it is possible to conduct a work over the entire work area A, and it is possible to prevent the occurrence of the problem in that it is difficult to do a work as the route area is beaten due to the overlapped travel that is the travel multiple times on the same overlapped route area in the target route P of the tractor 1. On the other hand, the presence of the circling travel route area P1 causes an increase in the non-working travel distance on the target route P and thus an increase in the fuel consumption and an increase in the working time.

In a case where the first target route illustrated in FIG. 12 is selected as the target route P, it is possible to conduct a work over the entire work area A and, as the non-working travel distance in the target route P is shortened, it is possible to achieve a reduction in the fuel consumption and a reduction in the working time due to a reduction in the non-working travel distance. On the other hand, there is a possibility of the problem in that it is difficult to conduct a work as the previous first straight work route area P2a is beaten due to the overlapped travel such that the tractor 1 travels in the previous first straight work route area P2a twice.

For example, in accordance with the user's manual operation on the substantially rectangular field including the projection portion 37 illustrated in FIGS. 9 to 12 during the operation screen display process, as illustrated in FIG. 10, when the plurality of work area determination points (the four work area determination points Ap1 to Ap4 in FIG. 10) for determining the rectangular shape of the work area A different from the shape of the field are arbitrarily input, the autonomous travel start point ps and the autonomous travel end point pe corresponding to the entrance and the exit of the field are arbitrarily input, and the reference work direction θp in a direction along the short side of the work area A is arbitrarily input, and then a command is received from the generation command part 35, the target route generation part 30D generates the second target route illustrated in FIG. 10 as the target route P during the second target route generation process. Then, during the generated route selection process, the generated second target route is displayed together with the above-described route selection part 32, or the like, on the liquid crystal panel 4 so that the user is caused to make a selection as to whether the generated second target route is to be used.

Here, for example, if the user feels dissatisfied with the occurrence of the unworked area Pb in the last first straight work route area P2a with regard to the second target route illustrated in FIG. 10, the refusal of the second target route illustrated in FIG. 10 is selected by the route selection part 32, the maximization of the working size is selected as a priority item for correction, and then a command operation is performed by the generation command part 35 so that, during the target route correction process by the target route generation part 30D based on the above, for example, two types of second target routes illustrated in FIGS. 11 to 12 may be generated as the second target route corrected based on the maximization of the working size.

Furthermore, if the user feels dissatisfied with the second target route illustrated in FIG. 10 as described above, for example, the refusal of the second target route illustrated in FIG. 10 is selected by the route selection part 32, the maximization of the working size and the avoidance of generation of the overlapped route area P0 are selected as priority items for correction, and then a command operation is performed by the generation command part 35 so that, during the target route correction process by the target route generation part 30D based on the above, for example, the second target route illustrated in FIG. 11 may be generated as the second target route corrected based on the maximization of the working size and the avoidance of generation of the overlapped route area P0.

Furthermore, if the user feels dissatisfied with the second target route illustrated in FIG. 10 as described above, for example, the refusal of the second target route illustrated in FIG. 10 is selected by the route selection part 32, the maximization of the working size and the minimization of the non-working travel distance are selected as priority items for correction, and then a command operation is performed by the generation command part 35 so that, during the target route correction process by the target route generation part 30D based on the above, for example, the second target route illustrated in FIG. 12 may be generated as the second target route corrected based on the maximization of the working size and the minimization of the non-working travel distance.

Figure 13:
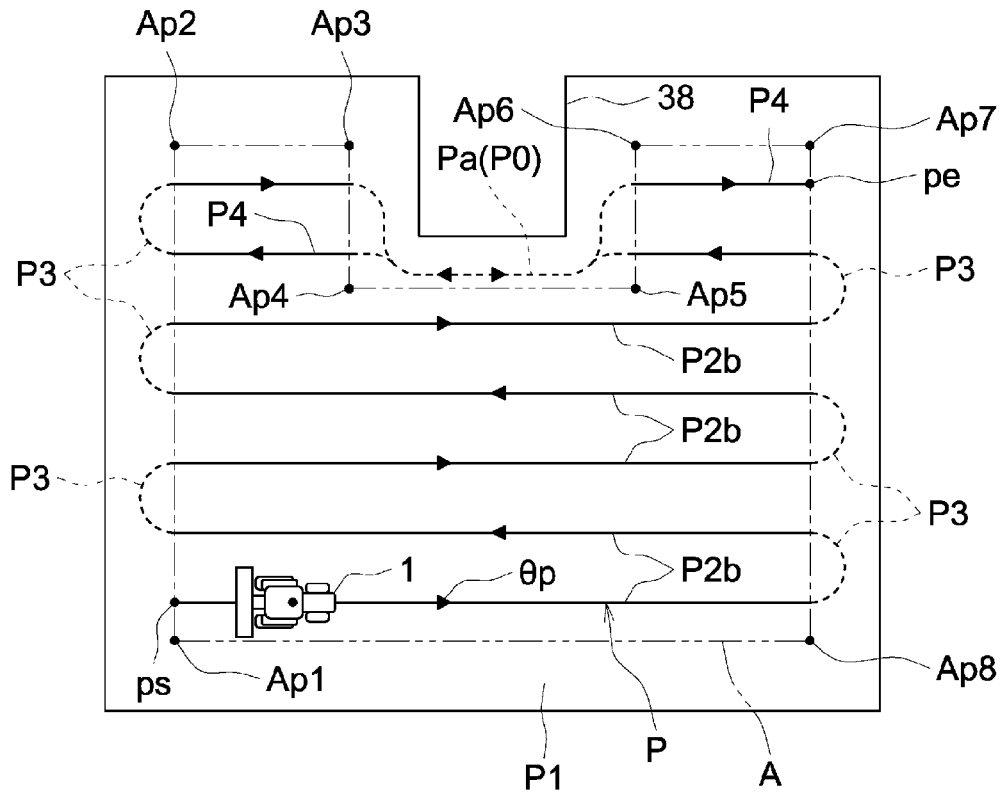
FIG. 13 is a diagram illustrating a ninth example route among the target routes generated by the target route generation part.
Figure 14:
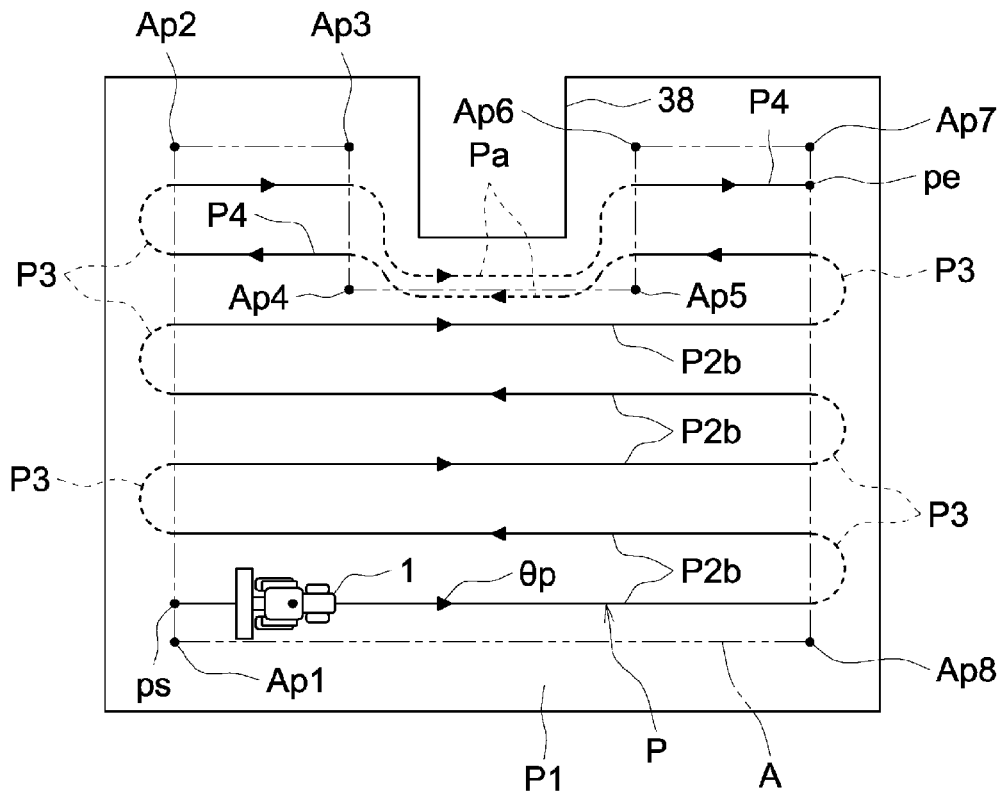
FIG. 14 is a diagram illustrating a tenth example route among the target routes generated by the target route generation part.
Figure 15:
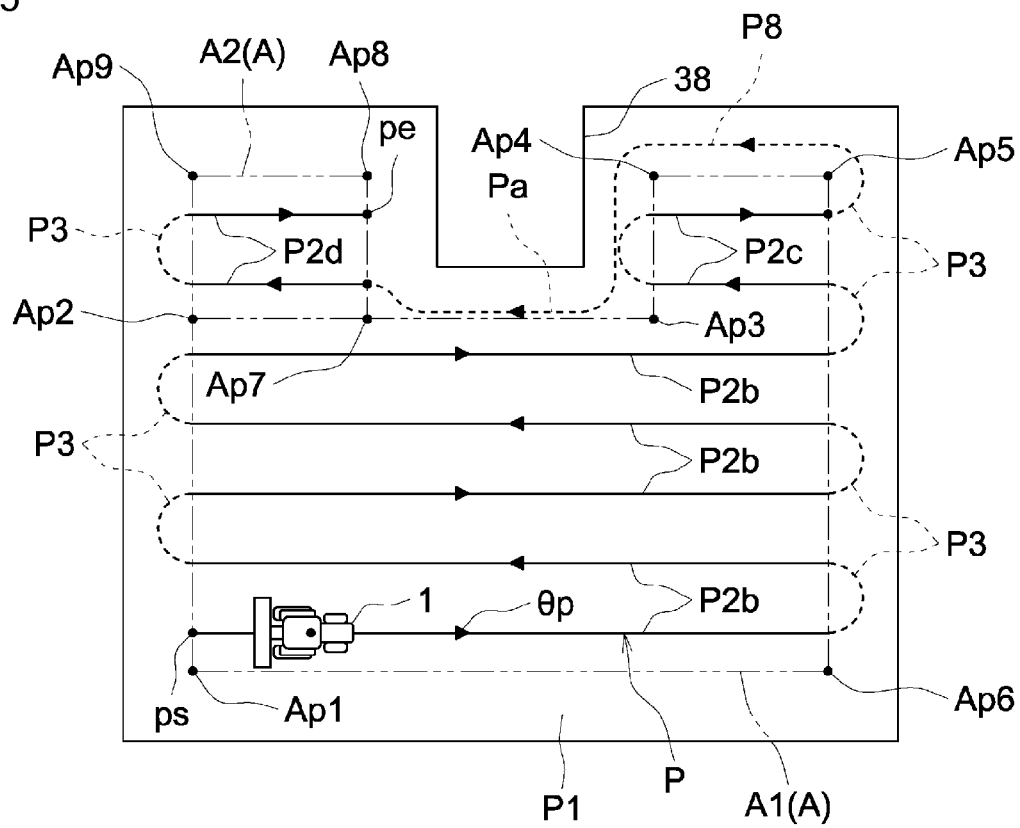
FIG. 15 is a diagram illustrating an eleventh example route among the target routes generated by the target route generation part.

For example, in accordance with the user's operation on a recessed field including a projection portion 38 illustrated in FIGS. 13 to 15 during the operation screen display process, as illustrated in FIG. 13, when the plurality of work area determination points (the eight work area determination points Ap1 to Ap8 in FIG. 13) for determining the recessed shape of the work area A similar to the shape of the field are arbitrarily input, the autonomous travel start point ps and the autonomous travel end point pe corresponding to the entrance and the exit of the field are arbitrarily input, the reference work direction θp in a direction along the long side of the work area A is arbitrarily input, and then a command is received from the generation command part 35, the target route generation part 30D generates the second target route illustrated in FIG. 13 as the target route P during the second target route generation process. Then, during the generated route selection process, the generated second target route is displayed together with the above-described route selection part 32, or the like, on the liquid crystal panel 4 so that the user is caused to make a selection as to whether the generated second target route is to be used.

The second target route illustrated in FIG. 13 includes above-described the plurality of second straight work route areas P2b, the two detour work route areas P4 including the common detour route area Pa to make a detour around the projection portion 38, and the plurality of direction change route areas P3 extending from the end point to the start point of the adjacent first straight work route areas P2a and the detour work route area P4 so as to enable the autonomous travel of the tractor 1 from the autonomous travel start point ps to the autonomous travel end point pe, which are arbitrarily input by the user.

In this case, the common detour route area Pa is the overlapped route area P0 where the tractor 1 travels in an overlapped manner during the autonomous travel of the tractor 1, and therefore there is a possibility of a problem in that it is difficult to conduct a work as the detour route area Pa is beaten due to the overlapped travel of the tractor 1.

For example, in accordance with the user's operation on the recessed field including the projection portion 38 illustrated in FIGS. 13 to 15 during the operation screen display process, when the optimization of the circling travel route area is selected as a priority item and then a command is received from the generation command part 35, the target route generation part 30D automatically determines the plurality of work area determination points (the eight work area determination points Ap1 to Ap8 in FIGS. 13 to 14, the nine work area determination points Ap1 to Ap9 in FIG. 15), the autonomous travel start point ps, the autonomous travel end point pe, and the like, so as to obtain the recessed work area A that may ensure the circling travel route area (circling travel area) P1 in the interval with the outer periphery of the field and generates the first target route, or the like, illustrated in FIG. 13 as the target route P corresponding to the optimization of the circling travel route area P1 during the first target route generation process. Then, during the generated route selection process, the generated first target route is displayed together with the above-described route selection part 32, or the like, on the liquid crystal panel 4 so that the user is caused to make a selection as to whether the generated first target route is to be used.

Here, for example, if the user feels dissatisfied with the presence of the overlapped route area P0 with regard to the first target route illustrated in FIG. 13, the refusal of the first target route, or the like, illustrated in FIG. 13 is selected by the route selection part 32, the avoidance of generation of the overlapped route area P0 is selected as a priority item for correction, and then a command operation is performed by the generation command part 35 so that, during the target route correction process by the target route generation part 30D based on the above, for example, two types of first target routes illustrated in FIGS. 14 to 15 may be generated as the first target routes corrected based on the avoidance of generation of the overlapped route area P0.

To generate the first target route illustrated in FIG. 15, the target route generation part 30D selects the nine work area determination points Ap1 to Ap9, automatically divides the recessed work area A into two, a larger L-shaped first area A1 and a smaller rectangular second area A2, and automatically determines the travel start points and the travel end points of the first area A1 and the second area A2.

The first target route illustrated in FIG. 14 includes above-described the plurality of second straight work route areas P2b, the two detour work route areas P4 including the detour route area Pa to make a detour around the projection portion 38, and the plurality of direction change route areas P3 extending from the end point to the start point of the adjacent first straight work route areas P2a and the detour work route area P4 so as to enable the autonomous travel of the tractor 1 from the autonomous travel start point ps to the autonomous travel end point pe determined by the target route generation part 30D. That is, the first target route illustrated in FIG. 14 includes the two detour work route areas P4 so as to eliminate the overlapped route area P0 for the overlapped travel of the tractor 1 that is generated in the first target route illustrated in FIG. 13, thus, it is possible to prevent the problem in that it is difficult to conduct a work as the overlapped route area P0 is beaten.

The first target route illustrated in FIG. 15 includes the plurality of above-described second straight work route areas P2b generated in the wide area of the first area A1, a plurality of third straight work route areas P2c generated in the narrow area of the first area A1 with the same arrangement setting as that of the second straight work route area P2b, fourth straight work route areas P2d generated in the second area A2 with the same arrangement setting as that of the second straight work route area P2b, the plurality of direction change route areas P3 extending from the end point to the start point of the adjacent first straight work route areas P2a to the fourth straight work route areas P2d, and a single detour move route area P8 including the detour route area Pa to make a detour around the projection portion 38 and extending from the travel end point of the first area A1 to the travel start point of the second area A2 so as to enable the autonomous travel of the tractor 1 from the autonomous travel start point ps to the autonomous travel end point pe determined by the target route generation part 30D. That is, the first target route illustrated in FIG. 15 includes the single detour move route area P8 so as to eliminate the overlapped route area P0 for the overlapped travel of the tractor 1 that is generated in the first target route illustrated in FIG. 13, thus, it is possible to prevent the problem in that it is difficult to conduct a work as the overlapped route area P0 is beaten.

Figure 16:
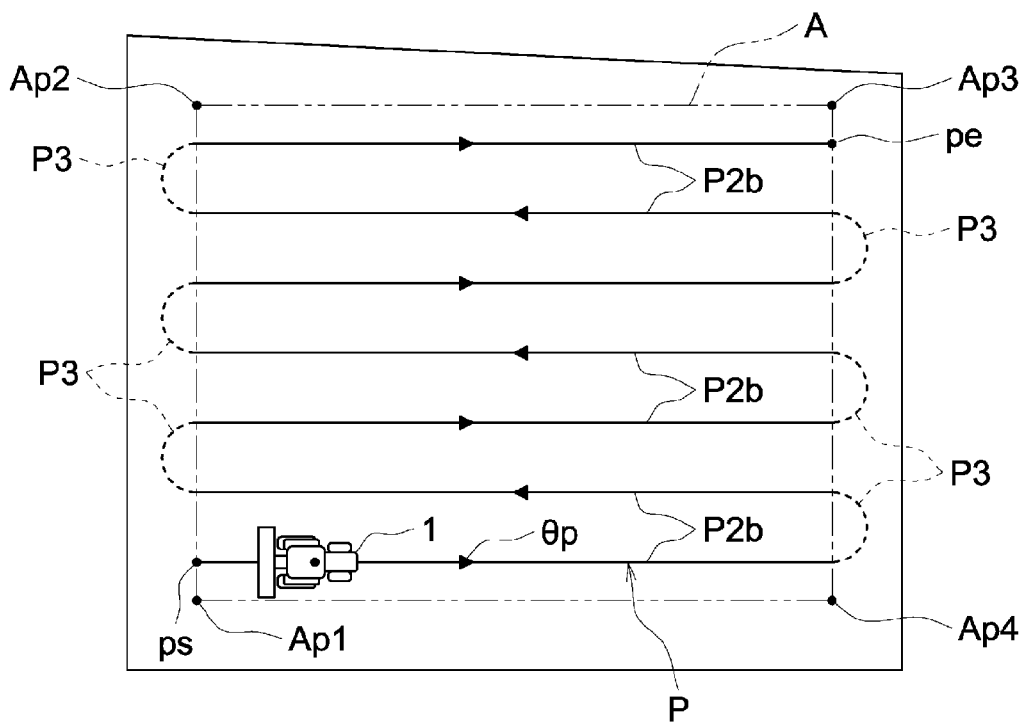
FIG. 16 is a diagram illustrating a twelfth example route among the target routes generated by the target route generation part.
Figure 17:
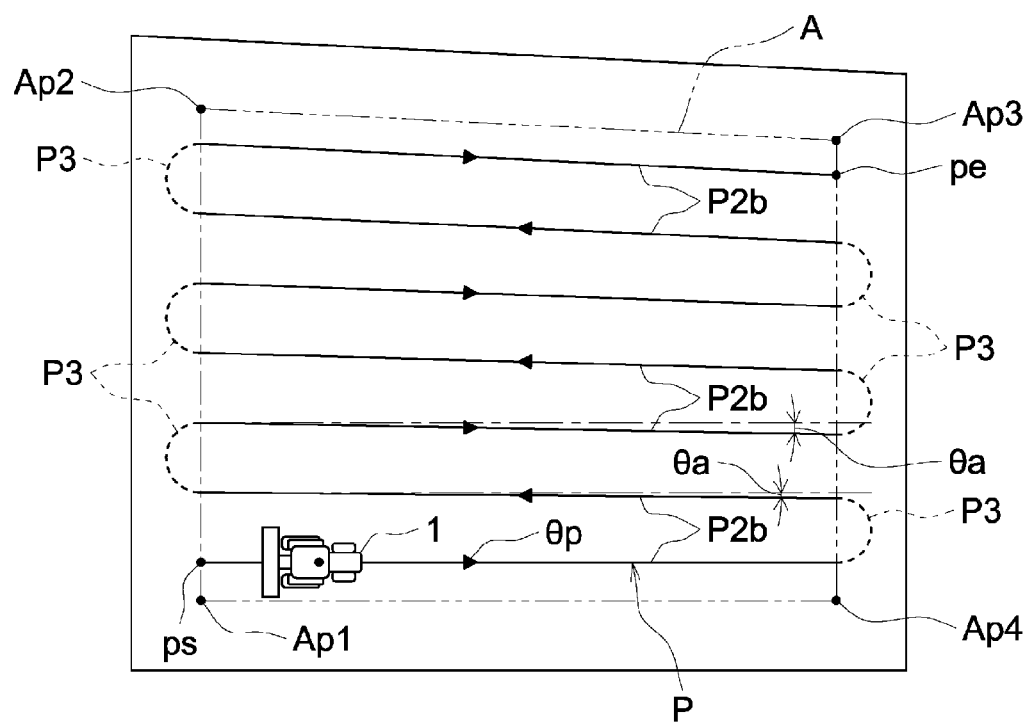
FIG. 17 is a diagram illustrating a thirteenth example route among the target routes generated by the target route generation part.

For example, in accordance with the user's operation on a trapezoidal field illustrated in FIGS. 16 to 17 during the operation screen display process, as illustrated in FIG. 16, when the plurality of work area determination points (the four work area determination points Ap1 to Ap4 in FIG. 16) for determining the rectangular shape of the work area A different from the shape of the field are arbitrarily input, the autonomous travel start point ps and the autonomous travel end point pe corresponding to the entrance and the exit of the field are arbitrarily input, the reference work direction θp in a direction along the long side of the work area A is arbitrarily input, and then a command is received from the generation command part 35, the target route generation part 30D generates the second target route illustrated in FIG. 16 as the target route P during the second target route generation process.

The second target route illustrated in FIG. 16 includes above-described the plurality of second straight work route areas P2b and the plurality of direction change route areas P3 extending from the end point to the start point of the adjacent second straight work route areas P2b so as to enable the autonomous travel of the tractor 1 from the autonomous travel start point ps to the autonomous travel end point pe that are arbitrarily input by the user.

For example, in accordance with the user's operation on the trapezoidal field illustrated in FIGS. 16 to 17 during the operation screen display process, as illustrated in FIG. 17, when the optimization of the circling travel route area P1 is selected as a priority item and then a command is received from the generation command part 35, the target route generation part 30D automatically determines the plurality of work area determination points (the four work area determination points Ap1 to Ap4 in FIG. 17), the autonomous travel end point pe, the working width, and the like, so as to obtain the trapezoidal work area A that may ensure the circling travel route area (circling travel area) P1 in the interval with the outer periphery of the field and generates the first target route illustrated in FIG. 17 as the target route P during the first target route generation process.

The first target route illustrated in FIG. 17 includes the plurality of above-described second straight work route areas P2b and the plurality of direction change route areas P3 extending from the end point to the start point of the adjacent second straight work route areas P2b so as to enable the autonomous travel of the tractor 1 from the autonomous travel start point ps to the autonomous travel end point pe determined by the target route generation part 30D.

The plurality of second straight work route areas P2b in the first target route illustrated in FIG. 17 are set such that the direction of each of the second straight work route areas P2b has a different adjustment angle θa with respect to the reference work direction θp based on the trapezoidal shape of the work area A so that the overlap degree of the working width gradually changes in accordance with the trapezoidal work area A during the autonomous travel of the tractor 1 in the second straight work route area P2b.

Thus, after the tilling work is performed due to the autonomous travel of the tractor 1 at the work area A on the center side of the field, the width of the circling travel route area P1, which is the remaining unworked area in the neighborhood, may be the same or substantially the same as the integral multiple of the working width. Accordingly, it is easy to perform the circling work travel of the tractor 1 due to the manual drive or the autonomous travel of the tractor 1.

Figure 18:
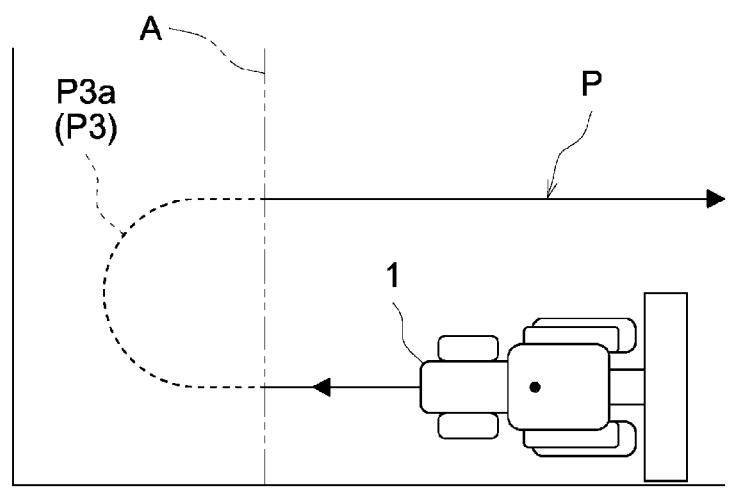
FIG. 18 is a diagram illustrating a first example route area among direction change route areas of the target route generated by the target route generation part.
Figure 19:
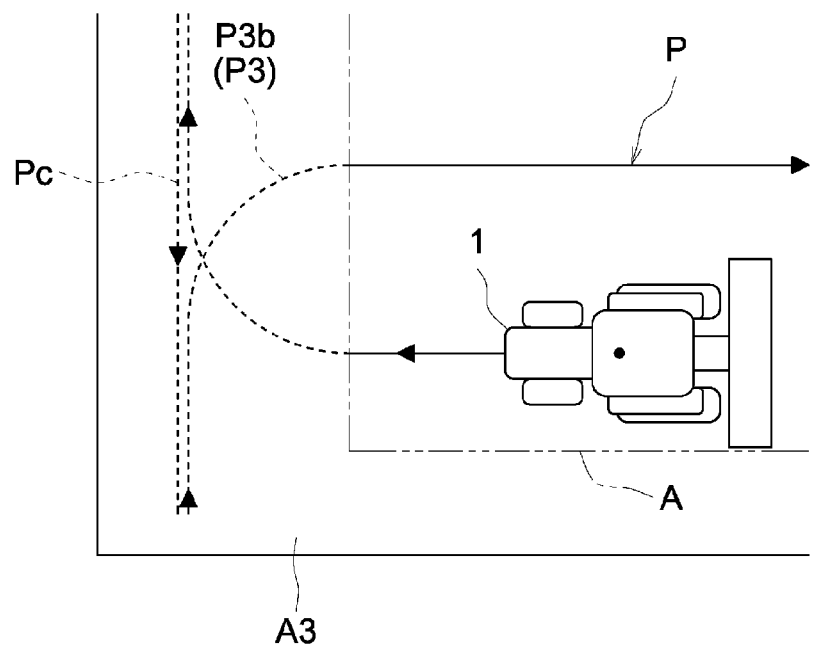
FIG. 19 is a diagram illustrating a second example route area among direction change route areas of the target route generated by the target route generation part.

For example, in accordance with the user's operation during the operation screen display process, in a case where the switchback turning illustrated in FIG. 19 using the switchback that is applied when the minimum turning radius is larger than half of the working width is arbitrarily input as the turning method instead of the typical U-shaped turning illustrated in FIG. 18 that is applied when the minimum turning radius is less than half of the working width, when the second target route including a second direction change route area P3b for the switchback turning illustrated in FIG. 19 is generated as the target route P during the second target route generation process, the maximization of the working size is selected as a priority item for correction, and then a command is received from the generation command part 35, the target route generation part 30D first determines whether the use of the switchback turning is appropriate based on the minimum turning radius of the tractor 1 and the working width included in the vehicle body data during the target route correction process. Then, when the use of the switchback turning is appropriate, the arbitrarily input switchback turning is applied, and the second direction change route area P3b for the switchback turning illustrated in FIG. 19 is generated as the above-described direction change route area P3. Alternatively, when the use of the switchback turning is not appropriate, the turning method is change from the arbitrarily input switchback turning to the U-shaped turning, and a first direction change route area P3a for the U-shaped turning illustrated in FIG. 18 is generated as the above-described direction change route area P3. Thus, due to this change in the turning method, it is possible to eliminate a non-working area A3 that includes a switchback route area Pc, which is longer than the working width, and that needs to be provided near the dike in the field to apply the switchback turning, and thus it is possible to achieve the maximization of the working size.

Although not illustrated, when the plurality of target routes P are generated, the target route generation part 30D performs a calculation process to calculate a difference in the working size, the non-working travel distance, and the like, based on the target routes P and performs a difference display process to cause the liquid crystal panel 4 to display the difference in the working size, the non-working travel distance, and the like, obtained during the calculation process together with the generated target routes P and give a notification to the user.

This allows the user to visually recognize the difference in an easy way when the target route generation part 30D generates the target routes P and to easily select the target route P more suitable for his/her own sense of value.

The target route generation part 30D stores the generated target route P in the terminal storage part 30A as the route data associated with the vehicle body data, the field data, and the like.

Thus, the target route generation part 30D may perform the above-described field data checking process based on the current position of the tractor 1 acquired by the positioning data acquisition part 30B and the above-described target route checking process based on the field data and the vehicle body data.

Although not illustrated, when it is not possible to generate the target route P based on the arbitrary setting data, which is input in accordance with the user's operation during the operation screen display process, as the arbitrary setting data is inappropriate, the target route generation part 30D performs an error display process to cause the liquid crystal panel 4 to display the impossibility of the generation of the target route P and the cause thereof so as to give a notification to the user and performs a solution display process to cause the liquid crystal panel 4 to display the solution so as to suggest it to the user.

For example, when it is not possible to generate the target route P as the work area A determined from the work area determination points input in accordance with the user's operation during the operation screen display process is too narrow, first, the liquid crystal panel 4 is caused to display error messages such as "target route generation error" and "no target route has been generated as the work area is too narrow" during the error display process so as to give a notification to the user. Then, during a solution display process, the liquid crystal panel 4 is caused to display the shape of the target field for a work, the work area A that is appropriate for the shape of the field, the message for checking the setting change to the appropriate work area A, and the like, so as to give a notification to the user.

For example, when it is not possible to generate the target route P as the work area A determined from the work area determination points input in accordance with the user's operation during the operation screen display process is too complicated, first, the liquid crystal panel 4 is caused to display error messages such as "target route generation error" and "no target route has been generated as the work area is too complicated" during the error display process so as to give a notification to the user. Then, during a solution display process, the liquid crystal panel 4 is caused to display the shape of the target field for a work, the work area A that is appropriately simplified with regard to the shape of the field, the message for checking the setting change to the simplified work area A, and the like, so as to give a notification to the user.

For example, when it is not possible to generate the target route P as the reference work direction θp input in accordance with the user's operation during the operation screen display process is not appropriate, first, the liquid crystal panel 4 is caused to display error messages such as "target route generation error" and "no target route has been generated as the reference work direction is not appropriate" during the error display process so as to give a notification to the user. Then, during the solution display process, the liquid crystal panel 4 is caused to display the shape of the target field for a work, the reference work direction θp that is appropriate with regard to the shape of the field, the message for checking the setting change to the appropriate reference work direction θp, and the like, so as to give a notification to the user.

From the above-described aspects, according to the target route generation system, when the target route P for the autonomous travel is generated, the user may select the normal operation for arbitrarily inputting all the arbitrary setting data necessary for generating the target route P with the arbitrary data input part 33 and the simple operation for performing the operation to select the priority item according to his/her own sense of value with the priority item selection part 34.

Thus, if the user is used to the operation for inputting arbitrary setting data, the user may perform the normal operation so as to obtain the target route P (the second target route) based on his/her own sense of value, etc. Alternatively, if the user is not skillful at the operation for inputting arbitrary setting data, the user may perform the simple operation so as to easily obtain the target route P (the first target route) suitable for his/her sense of value, etc. Furthermore, if the user feels dissatisfied with the generated target route P, the user performs a correction operation to eliminate his/her dissatisfaction, for example, inputs corrected or added arbitrary setting data with the arbitrary data input part 33 or selects an additional priority item with the priority item selection part 34, so as to obtain the target route P in which the dissatisfaction is eliminated.

Another Embodiment

Another embodiment of the present invention is described.

Furthermore, the configuration of each embodiment described below is not always applied alone but may be applied in combination with the configuration of another embodiment.

(1) The target route generation system for a work vehicle may be included in the work vehicle 1.

(2) Various modifications may be made to the configuration of the work vehicle 1.

For example, the work vehicle 1 may be configured to include the engine 10 and an electric motor for traveling so as to be designed for hybrid or may be configured to include an electric motor for traveling instead of the engine 10 so as to be designed for electrification.

For example, the work vehicle 1 may be designed for rear-wheel steering in which the right and left rear wheels 8 function as steering wheels.

For example, the work vehicle 1 may be configured to include right and left crawlers instead of the right and left rear wheels 8 so as to be designed as a semi crawler.

For example, the work vehicle 1 may be configured to include right and left crawlers instead of the right and left front wheels 7 and the right and left rear wheels 8 so as to be designed as a full crawler.

(3) The target route generation part 30D may be configured to, when the second target route is generated as the target route P based on arbitrary setting data, automatically generate the first target route based on a priority item and cause the display part 4 to display the second target route and the first target route and also the difference between the second target route and the first target route based on the priority item.

(4) The target route generation part 30D may be configured to, when the first target route is generated as the target route P based on the selected priority item, automatically generate the first target route based on a different priority item and cause the display part 4 to display the first target routes and also the difference between the first target routes based on the priority item.

(5) The priority item selection part 34 may be configured to have, as the above-described priority item, a reduction in the fuel consumption, a reduction in the working time, a reduction in the number of route areas in the target route P, etc.

(6) The route selection part 32, the arbitrary data input part 33, and the priority item selection part 34 may be configured by using, for example, a keyboard including a key switch.

INDUSTRIAL APPLICABILITY

The present invention is applicable to a target route generation system for a work vehicle that generates a target route for the autonomous travel of a passenger work vehicle such as a tractor, a passenger rice planter, a combine, a passenger mower, a wheel loader, or a snowplow, and an unmanned work vehicle such as an unmanned mower, which are configured to enable the autonomous travel.

DESCRIPTION OF REFERENCE NUMERALS

4 Display part
30A Storage part

30D Target route generation part
32 Route selection part
33 Arbitrary data input part
34 Priority item selection part
P Target route

The invention claimed is:

1. A target route generation system for a work vehicle, comprising:
   a storage part that stores basic data necessary for generating a target route for autonomous travel;
   an arbitrary data input part for inputting arbitrary setting data for target route generation;
   a target route generation part that generates the target route based on the basic data and the arbitrary setting data; and
   a display part for notifying that the target route cannot be generated based on the arbitrary setting data,
   wherein the display part notifies a cause of inability to generate the target route.

2. The target route generation system for a work vehicle according to claim 1, wherein the display part notifies a solution capable of generating the target route.

3. The target route generation system for a work vehicle according to claim 1, the notification by the display part is a message.

* * * * *